(12) United States Patent
Tanner et al.

(10) Patent No.: US 9,907,432 B2
(45) Date of Patent: Mar. 6, 2018

(54) BEVERAGE PREPARATION MACHINES

(71) Applicant: Koninklijke Douwe Egberts B.V., Utrecht (NL)

(72) Inventors: Roger Geoffrey Tanner, Banbury Oxfordshire (GB); Andrew Michael Halliday, Chipping Norton Oxfordshire (GB)

(73) Assignee: Koninklijke Douwe Egberts B.V., Utrecht (NL)

( * ) Notice: Subject to any disclaimer, the term of this patent is extended or adjusted under 35 U.S.C. 154(b) by 185 days.

(21) Appl. No.: 14/738,824

(22) Filed: Jun. 12, 2015

(65) Prior Publication Data

US 2015/0272381 A1  Oct. 1, 2015

Related U.S. Application Data

(63) Continuation of application No. 12/600,627, filed as application No. PCT/US2008/063832 on May 16, 2008, now Pat. No. 9,084,509.

(Continued)

(30) Foreign Application Priority Data

May 18, 2007 (GB) .................................. 0709589.6

(51) Int. Cl.
*A47J 31/06* (2006.01)
*B65D 81/32* (2006.01)
(Continued)

(52) U.S. Cl.
CPC ........... *A47J 31/46* (2013.01); *A47J 31/0673* (2013.01); *A47J 31/3695* (2013.01); *A47J 31/407* (2013.01); *A47J 2201/00* (2013.01)

(58) Field of Classification Search
CPC ................ A47J 2201/00; A47J 31/0673; A47J 31/3695; A47J 31/407; A47J 31/46
(Continued)

(56) References Cited

U.S. PATENT DOCUMENTS 2,243,895 A 6/1941 Brown
2,715,868 A 8/1955 Brown
(Continued)

FOREIGN PATENT DOCUMENTS

EP 0151252 A1 8/1985
EP 0334571 A1 9/1989
(Continued)

OTHER PUBLICATIONS

'More Solutions to Sticky Problems,' A Guide To Getting More From Your Brookfield Viscometer, Brookfield Engineering Laboratories, Inc., Stoughton, MA, May, 1985, 28 pages.
(Continued)

*Primary Examiner* — Dana Ross
*Assistant Examiner* — Ket D Dang
(74) *Attorney, Agent, or Firm* — Fitch, Even, Tabin & Flannery LLP

(57) ABSTRACT

A delivery head for a beverage preparation machine comprising a movable first part and a fixed second part, the first part being movable relative to the second part between an open position and a closed position, in the open position the first part being positioned to enable loading of a cartridge into the delivery head, in the closed position the first part and second part being positioned to hold said cartridge in a dispensing position, the delivery head further comprising an inlet piercer and an outlet piercer, the inlet piercer and the outlet piercer being orientated substantially in the same direction and being pivotable relative to the fixed second part between a retracted position and a piercing position.

12 Claims, 12 Drawing Sheets

Related U.S. Application Data

(60) Provisional application No. 60/940,118, filed on May 25, 2007.

(51) Int. Cl.
  *B67D 7/06* (2010.01)
  *A47J 31/46* (2006.01)
  *A47J 31/36* (2006.01)
  *A47J 31/40* (2006.01)

(58) Field of Classification Search
  USPC ...... 99/295, 279, 280, 537, 283, 282; 222/1, 222/23, 145, 145.5; 426/112
  See application file for complete search history.

(56) References Cited

U.S. PATENT DOCUMENTS

| | | |
|---|---|---|
| 2,899,106 A | 8/1959 | Weinert |
| 3,292,527 A | 12/1966 | Roland |
| 3,336,857 A | 8/1967 | Knodt et al. |
| 3,403,617 A | 10/1968 | Lampe |
| 3,607,297 A | 9/1971 | Fasano |
| 3,805,999 A | 4/1974 | Syverson |
| 4,136,202 A | 1/1979 | Favre |
| D255,529 S | 6/1980 | Dziekonski |
| 4,206,694 A | 6/1980 | Moskowitz |
| 4,253,385 A | 3/1981 | Illy |
| 4,382,402 A | 5/1983 | Alvarez |
| 4,389,191 A | 6/1983 | Lowe |
| 4,418,460 A | 12/1983 | Ruth |
| 4,452,130 A | 6/1984 | Klein |
| 4,484,515 A | 11/1984 | Illy |
| 4,551,611 A | 11/1985 | Longo |
| 4,653,390 A | 3/1987 | Hayes |
| 4,724,752 A | 2/1988 | Aliesch |
| 4,738,378 A | 4/1988 | Oakley |
| 4,744,291 A | 5/1988 | Wallin |
| 4,775,048 A | 10/1988 | Baecchi |
| 4,787,299 A | 11/1988 | Levi |
| 4,838,152 A | 6/1989 | Kubicko |
| 4,846,052 A | 7/1989 | Favre |
| 4,873,915 A | 10/1989 | Newman |
| 4,875,408 A | 10/1989 | McGee |
| 4,876,953 A | 10/1989 | Imamura |
| 4,917,005 A | 4/1990 | Knepler |
| 4,920,252 A | 4/1990 | Yoshino |
| 4,920,870 A | 5/1990 | Newman |
| 4,921,712 A | 5/1990 | Malmquist |
| 4,990,352 A | 2/1991 | Newman |
| D316,795 S | 5/1991 | Brewer |
| 5,014,611 A | 5/1991 | Illy |
| 5,063,836 A | 11/1991 | Patel |
| 5,072,660 A | 12/1991 | Helbling |
| 5,080,008 A | 1/1992 | Helbling |
| 5,111,740 A | 5/1992 | Klein |
| 5,134,924 A | 8/1992 | Vicker |
| 5,178,058 A | 1/1993 | vanDort |
| 5,183,998 A | 2/1993 | Hoffman |
| 5,186,096 A | 2/1993 | Willi |
| 5,197,374 A | 3/1993 | Fond |
| 5,242,702 A | 9/1993 | Fond |
| 5,259,295 A | 11/1993 | Timm |
| 5,265,520 A | 11/1993 | Giuliano |
| 5,272,960 A | 12/1993 | Kinna |
| 5,285,717 A | 2/1994 | Knepler |
| 5,287,797 A | 2/1994 | Grykiewicz |
| 5,303,639 A | 4/1994 | Bunn |
| 5,325,765 A | 7/1994 | Sylvan |
| 5,327,815 A | 7/1994 | Fond |
| 5,343,799 A | 9/1994 | Fond |
| 5,347,916 A | 9/1994 | Fond |
| 5,349,897 A | 9/1994 | King |
| 5,375,508 A | 12/1994 | Knepler |
| 5,398,595 A | 3/1995 | Fond |
| 5,398,596 A | 3/1995 | Fond |
| 5,408,917 A | 4/1995 | Lussi |
| 5,440,972 A | 8/1995 | English |
| 5,455,887 A | 10/1995 | Dam |
| 5,463,932 A | 11/1995 | Olson |
| 5,472,719 A | 12/1995 | Favre |
| 5,479,849 A | 1/1996 | King |
| 5,531,152 A | 7/1996 | Gardosi |
| 5,549,035 A | 8/1996 | Wing-Chung |
| 5,603,254 A | 2/1997 | Fond |
| 5,638,740 A | 6/1997 | Cai |
| 5,638,741 A | 6/1997 | Cisaria |
| 5,639,023 A | 6/1997 | Hild |
| 5,649,472 A | 7/1997 | Fond |
| D389,694 S | 1/1998 | Vinson |
| 5,704,275 A | 1/1998 | Warne |
| 5,738,001 A | 4/1998 | Liverani |
| 5,755,149 A | 5/1998 | Blanc |
| 5,762,987 A | 6/1998 | Fond |
| 5,776,527 A | 7/1998 | Blanc |
| 5,794,519 A | 8/1998 | Fischer |
| 5,826,492 A | 10/1998 | Fond |
| 5,840,189 A | 11/1998 | Sylvan |
| 5,858,437 A | 1/1999 | Anson |
| 5,860,354 A | 1/1999 | Jouatel |
| 5,862,738 A | 1/1999 | Warne |
| 5,897,899 A | 4/1999 | Fond |
| 5,899,137 A | 5/1999 | Miller |
| 5,921,168 A | 7/1999 | Nello |
| 5,943,944 A | 8/1999 | Lassota |
| 5,967,021 A | 10/1999 | Yung |
| 5,974,950 A | 11/1999 | King |
| 5,992,298 A | 11/1999 | Illy |
| 6,000,317 A | 12/1999 | VanDerMeer |
| 6,006,653 A | 12/1999 | Sham |
| 6,009,792 A | 1/2000 | Kraan |
| D419,821 S | 2/2000 | Powell |
| 6,021,705 A | 2/2000 | Dijs |
| D423,863 S | 5/2000 | Lupi |
| 6,062,127 A | 5/2000 | Klosinski |
| 6,082,245 A | 7/2000 | Nicolai |
| 6,095,031 A | 8/2000 | Warne |
| 6,109,168 A | 8/2000 | Illy |
| 6,117,471 A | 9/2000 | King |
| 6,142,063 A | 11/2000 | Beaulieu |
| 6,158,328 A | 12/2000 | Cai |
| 6,170,386 B1 | 1/2001 | Paul |
| 6,173,117 B1 | 1/2001 | Clubb |
| 6,178,874 B1 | 1/2001 | Joergensen |
| 6,182,554 B1 | 2/2001 | Beaulieu |
| 6,186,051 B1 | 2/2001 | Aarts |
| D443,792 S | 6/2001 | Peters |
| 6,240,832 B1 | 6/2001 | Schmed |
| 6,240,833 B1 | 6/2001 | Sham |
| 6,245,371 B1 | 6/2001 | Gutwein |
| 6,279,459 B1 | 8/2001 | Mork |
| 6,289,948 B1 | 9/2001 | Jeannin |
| D452,107 S | 12/2001 | Cahen |
| D454,466 S | 3/2002 | Hong |
| 6,405,637 B1 | 6/2002 | Cai |
| D459,628 S | 7/2002 | Cahen |
| D460,653 S | 7/2002 | Cahen |
| D461,358 S | 8/2002 | Cahen |
| 6,499,388 B2 | 12/2002 | Schmed |
| 6,536,332 B2 | 3/2003 | Schmed |
| D475,567 S | 6/2003 | Hsu |
| 6,589,577 B2 | 7/2003 | Lazaris |
| 6,606,938 B2 | 8/2003 | Taylor |
| 6,607,762 B2 | 8/2003 | Lazaris |
| D479,939 S | 9/2003 | Au |
| 6,612,224 B2 | 9/2003 | Mercier |
| 6,644,173 B2 | 11/2003 | Lazaris |
| 6,645,537 B2 | 11/2003 | Sweeney |
| 6,672,200 B2 | 1/2004 | Duffy |
| 6,698,228 B2 | 3/2004 | Kateman |
| 6,698,332 B2 | 3/2004 | Kollep |
| 6,698,333 B2 | 3/2004 | Halliday |
| D489,930 S | 5/2004 | Tse |
| 6,759,072 B1 | 7/2004 | Gutwein |

(56) References Cited

U.S. PATENT DOCUMENTS

| | | |
|---|---|---|
| 6,786,136 B2 | 9/2004 | Cirigliano |
| D497,278 S | 10/2004 | Picozza |
| 6,799,503 B2 | 10/2004 | Kollep |
| 6,810,788 B2 | 11/2004 | Hale |
| 6,840,397 B1 | 1/2005 | Rosenberg |
| 6,857,353 B2 | 2/2005 | Kollep |
| D502,841 S | 3/2005 | Santer |
| 6,935,222 B2 | 8/2005 | Chen |
| 6,941,855 B2 | 9/2005 | Denisart |
| 6,955,116 B2 | 10/2005 | Hale |
| 7,063,238 B2 | 6/2006 | Hale |
| 7,097,074 B2 | 8/2006 | Halliday |
| D530,560 S | 10/2006 | Lin |
| 7,165,488 B2 | 1/2007 | Bragg |
| 7,213,506 B2 | 5/2007 | Halliday |
| 7,219,598 B2 | 5/2007 | Halliday |
| 7,231,869 B2 | 6/2007 | Halliday |
| 7,243,598 B2 | 7/2007 | Halliday |
| 7,255,039 B2 | 8/2007 | Halliday |
| 7,287,461 B2 | 10/2007 | Halliday |
| 7,308,851 B2 | 12/2007 | Halliday |
| 7,316,178 B2 | 1/2008 | Halliday |
| 7,322,277 B2 | 1/2008 | Halliday |
| 7,325,479 B2 | 2/2008 | Laigneau |
| 7,328,651 B2 | 2/2008 | Halliday |
| 7,340,990 B2 | 3/2008 | Halliday |
| 7,418,899 B2 | 9/2008 | Halliday |
| D582,714 S | 12/2008 | Hensel |
| D585,692 S | 2/2009 | Borin |
| 7,533,603 B2 | 5/2009 | Halliday |
| 7,533,604 B2 | 5/2009 | Halliday |
| 9,084,509 B2 | 7/2015 | Tanner |
| 2002/0002913 A1 | 1/2002 | Mariiler |
| 2002/0023543 A1 | 2/2002 | Schmed |
| 2002/0048621 A1 | 4/2002 | Boyd |
| 2002/0078831 A1 | 6/2002 | Cai |
| 2002/0121197 A1 | 9/2002 | Mercier |
| 2002/0121198 A1 | 9/2002 | Kollep |
| 2002/0124736 A1 | 9/2002 | Kollep |
| 2002/0129712 A1 | 9/2002 | Westbrook |
| 2002/0144602 A1 | 10/2002 | Taylor |
| 2002/0144603 A1 | 10/2002 | Taylor |
| 2002/0144604 A1 | 10/2002 | Winkler |
| 2002/0148356 A1 | 10/2002 | Lazaris |
| 2003/0056655 A1 | 3/2003 | Kollep |
| 2003/0066431 A1 | 4/2003 | Fanzutti |
| 2003/0145736 A1 | 8/2003 | Green |
| 2004/0089158 A1 | 5/2004 | Mahlich |
| 2004/0182250 A1 | 9/2004 | Halliday |
| 2004/0188459 A1* | 9/2004 | Halliday ............. A47J 31/0673 222/83 |
| 2004/0191370 A1 | 9/2004 | Halliday |
| 2004/0191372 A1 | 9/2004 | Halliday |
| 2004/0197444 A1 | 10/2004 | Halliday |
| 2004/0206245 A1 | 10/2004 | Halliday |
| 2004/0211322 A1 | 10/2004 | Halliday |
| 2004/0228955 A1 | 11/2004 | Denisart |
| 2004/0237793 A1 | 12/2004 | Zurcher |
| 2006/0107839 A1 | 5/2006 | Nenov |
| 2006/0123998 A1* | 6/2006 | Castellani ........... A47J 31/0673 99/495 |
| 2006/0226228 A1 | 10/2006 | Gagne |
| 2007/0068394 A1* | 3/2007 | Jarisch ................ A47J 31/3638 99/279 |
| 2007/0104837 A1 | 5/2007 | Yoakim |
| 2008/0229932 A1 | 9/2008 | Magg |

FOREIGN PATENT DOCUMENTS

| | | |
|---|---|---|
| EP | 0334572 A1 | 9/1989 |
| EP | 0162417 B1 | 3/1990 |
| EP | 0469162 A1 | 2/1992 |
| EP | 0638486 A1 | 2/1995 |
| EP | 0604615 B1 | 9/1998 |
| EP | 0862882 A1 | 9/1998 |
| EP | 0870457 A1 | 10/1998 |
| EP | 0904718 A1 | 3/1999 |
| EP | 1090574 A1 | 4/2001 |
| EP | 1095605 A1 | 5/2001 |
| EP | 1153561 A1 | 11/2001 |
| EP | 1208782 | 5/2002 |
| EP | 0862882 B1 | 7/2002 |
| EP | 0919171 B1 | 1/2003 |
| EP | 1316283 A2 | 6/2003 |
| EP | 0904719 B1 | 8/2003 |
| EP | 1440640 A2 | 7/2004 |
| EP | 1440644 | 7/2004 |
| EP | 1518484 A1 | 3/2005 |
| EP | 1580144 | 9/2005 |
| EP | 1669011 A1 | 6/2006 |
| EP | 1541070 B1 | 11/2006 |
| EP | 1767129 | 3/2007 |
| EP | 1772398 A1 | 4/2007 |
| FR | 1537031 A | 8/1968 |
| GB | 468248 | 7/1937 |
| GB | 828529 | 2/1960 |
| GB | 1215840 A | 12/1970 |
| GB | 2374795 A | 10/2002 |
| GB | 2374816 A | 10/2002 |
| GB | 2374856 A | 10/2002 |
| GB | 2379624 A | 3/2003 |
| GB | 2380990 A | 4/2003 |
| GB | 2397499 A | 7/2004 |
| GB | 2397500 A | 7/2004 |
| GB | 2397503 | 7/2004 |
| GB | 2411105 | 8/2005 |
| GB | 2409965 B | 9/2005 |
| JP | 287759 U | 7/1990 |
| JP | 618259 U | 3/1994 |
| JP | 2000355375 A | 12/2000 |
| JP | 2001202564 | 7/2001 |
| RU | 688175 A | 9/1979 |
| RU | 2086411 C1 | 8/1997 |
| RU | 2005126705 A | 6/2006 |
| RU | 2283016 C2 | 9/2006 |
| RU | 2286076 C2 | 10/2006 |
| WO | 8602537 A1 | 5/1986 |
| WO | 9507648 A1 | 3/1995 |
| WO | 9516377 A1 | 6/1995 |
| WO | 9608990 A1 | 3/1996 |
| WO | 9717006 A1 | 5/1997 |
| WO | 9828203 | 7/1998 |
| WO | 9847418 A1 | 10/1998 |
| WO | 0042891 A1 | 7/2000 |
| WO | 0115582 A1 | 3/2001 |
| WO | 0219875 A1 | 3/2002 |
| WO | 02080745 A1 | 10/2002 |
| WO | 02085170 A2 | 10/2002 |
| WO | 02087400 A1 | 11/2002 |
| WO | 03005295 A1 | 1/2003 |
| WO | 02085170 A3 | 3/2003 |
| WO | 03026470 A2 | 4/2003 |
| WO | 03053200 A1 | 7/2003 |
| WO | 03065859 A2 | 8/2003 |
| WO | 03065859 A3 | 12/2003 |
| WO | 2003059778 A3 | 1/2004 |
| WO | 2005079638 | 9/2005 |
| WO | 2006038227 | 4/2006 |

OTHER PUBLICATIONS

'The Helipath Stand,' A Brookfield Viscometer Accessory, Brookfield Engineering Laboratories, Inc., Stoughton, Massachusetts, date unknown, 2 pages.

Codex Standard for Evaporated Milks, Codex Stan A-3.1971, Rev. Jan. 1999, 3 pages.

European Patent Office Brief Communication dated Aug. 30, 2007, Opposition to European Patent EP 1 440 910 B1, Letter from Opponent Mars Incorporated dated Aug. 22, 2007, 3 pages.

European Patent Office Brief Communication dated Jul. 9, 2007, Opposition to European Patent EP 1 440 908 B1, Letter from Opponent Friesland Brands B.V. dated Jul. 3, 2007, 21 pages.

(56) References Cited

OTHER PUBLICATIONS

European Patent Office Communication of a Notice of Opposition dated Aug. 12, 2008, Opposition to European Patent EP 1 440 640 B1 by Opponent Nestec S.A, 17 pages.
European Patent Office Communication of a Notice of Opposition dated Mar. 22, 2007, Opposition to European Patent EP 1 440 910 B1 by Opponent Mars Incorporated, 17 pages.
European Patent Office Communication of a Notice of Opposition dated Mar. 22, 2007, Opposition to European Patent Ep 1 440 910 B1 by Opponent Nestec S.A., 12 pp.
European Patent Office Communication of a Notice of Opposition dated May 22, 2007, Opposition to European Patent EP 1 440 908 B1 by Opponent Sara Lee/DE N.V., 13 pages.
European Patent Office Partial Search Report for European Application EP 04 25 0364.9 dated May 11, 2004, 4 pages.
European Patent Office Search Report for European Application EP 04 25 0357.3 dated May 11, 2004, 3 pages.
European Patent Office Search Report for European Application EP 04 25 0360.7 dated May 7, 2004, 3 pages.
European Patent Office Search Report for European Application EP 04 25 0361.5 dated May 4, 2004, 3 pages.
European Patent Office Search Report for European Application EP 04 25 0362.3 dated Mar. 22, 2004, 3 pages.
European Patent Office Search Report for European Application EP 04 25 0363.1 dated May 17, 2004, 3 pages.
European Patent Office Search Report for European Application EP 04 25 0365.6 dated May 7, 2004, 4 pages.
European Patent Office Search Report for European Application EP 04 25 0366.4 dated Mar. 18, 2004, 3 pages.
European Patent Office Search Report for European Application EP 04 25 0376.3 dated Mar. 23, 2004, 3 pages.
European Patent Office Search Report for European Application EP 04 25 0377.1 dated May 7, 2004, 3 pages.
European Patent Office Search Report for European Application EP 04 25 0380.5 dated May 10, 2004, 3 pages.
European Patent Office Search Report for European Application EP 04 25 0381.3 dated May 7, 2004, 4 pages.
European Patent Office Search Report for European Application EP 04 25 0382.1 dated May 7, 2004, 3 pages.
European Patent Office Search Report for European Application EP 04 25 0383.9 dated May 28, 2004, 4 pages.
European Patent Office Search Report for European Application EP 04 25 0384.7 dated May 7, 2004, 3 pages.
European Patent Office Search Report for European Application EP 04 25 0388.8 dated Jun. 1, 2004, 3 pages.
European Patent Office Search Report for European Application EP 04 25 0389.6 dated May 17, 2004, 3 pages.
European Patent Office Search Report for European Application EP 04 25 0390.4 dated Jun. 17, 2004, 4 pages.
Harold McGee, 'On Food and Cooking,' The Science and Lore of the Kitchen, Harper Collins Publishers, London, 1991, p. 16.
International Search Report and Written Opinion from corresponding International (PCT) Patent Application No. PCT/US2008/063832 dated Sep. 4, 2008 (7 pages).
Notice of Opposition to a European Patent dated May 16, 2007, Opposition to European Patent EP 1 440 908 B1 by Opponent Friesland Brands B.V., 22 pages.
Notice of Opposition to a European Patent dated May 16, 2007, Opposition to European Patent EP 1 440 908 B1 by Opponent Nestec S.A., 9 pages.
Notice of Opposition to a European Patent dated Sep. 13, 2007, Opposition to European Patent EP 1 440 909 B1 by Opponent Friesland Brands B.V., 9 pages.
Notice of Opposition to a European Patent dated Sep. 13, 2007, Opposition to European Patent EP 1 440 909 B1 by Opponent Nestec S.A., 7 pages.
PCT International Search Report and Written Opinion of the European Patent Office International Searching Authority for International Application PCT/GB2004/000268 dated May 24, 2004, 10 pages.
PCT International Search Report and Written Opinion of the European Patent Office International Searching Authority for International Application PCT/GB2004/000272 dated Sep. 7, 2004, 17 pages.
PCT International Search Report and Written Opinion of the European Patent Office International Searching Authority for International Application PCT/GB2004/000273 dated May 12, 2004, 9 pages.
PCT International Search Report and Written Opinion of the European Patent Office International Searching Authority for International Application PCT/GB2004/000276 dated Sep. 7, 2004, 19 pages.
PCT International Search Report and Written Opinion of the European Patent Office International Searching Authority for International Application PCT/GB2004/000279 dated May 17, 2004, 9 pages.
PCT International Search Report and Written Opinion of the European Patent Office International Searching Authority for International Application PCT/GB2004/000282 dated Jun. 3, 2004, 9 pages.
PCT International Search Report and Written Opinion of the European Patent Office International Searching Authority for International Application PCT/GB2004/000287 dated Jun. 16, 2004, 10 pages.
PCT Invitation to Pay Additional Fees and Communication Relating to the Results of the Partial International Search Report of the European Patent Office International Searching Authority for International Application PCT/GB2004/000272 dated May 11, 2004, 5 pages.
PCT Invitation to Pay Additional Fees and Communication Relating to the Results of the Partial International Search Report of the European Patent Office International Searching Authority for International Application PCT/GB2004/000276 dated May 24, 2004, 7 pages.
PCT Invitation to Pay Additional Fees and Communication Relating to the Results of the Partial International Search Report of the European Patent Office International Searching Authority for International Application PCT/GB2004/000265 dated Jun. 17, 2004, 6 pages.
Scherz, Heimo et al., 'Food Composition and Nutrition Tables,'Stuttgart: Medpharm Scientific Publishers, 1994, Ed, 5, 5 pages.
The United Kingdom Patent Office Combined Search and Examination Report for Great Britain Application GB 0301679.7 dated Jun. 16, 2003, 4 pages.
The United Kingdom Patent Office Combined Search and Examination Report for Great Britain Application GB 0301680.5 dated Jun. 19, 2003, 5 pages.
The United Kingdom Patent Office Combined Search and Examination Report for Great Britain Application GB 0301681.3 dated Jun. 24, 2003, 4 pages.
The United Kingdom Patent Office Combined Search and Examination Report for Great Britain Application GB 0301696.1 dated May 27, 2003, 4 pages.
The United Kingdom Patent Office Combined Search and Examination Report for Great Britain Application GB 0301698.7 dated Jun. 16, 2003, 4 pages.
The United Kingdom Patent Office Combined Search and Examination Report for Great Britain Application GB 0301702.7 dated May 16, 2003, 4 pages.
The United Kingdom Patent Office Combined Search and Examination Report for Great Britain Application GB 0301708.4 dated Jun. 12, 2003, 4 pages.
The United Kingdom Patent Office Combined Search and Examination Report for Great Britain Application GB 0301709.2 dated May 8, 2003, 4 pages.
The United Kingdom Patent Office Combined Search and Examination Report for Great Britain Application GB 0301710.0 dated Jun. 12, 2003, 4 pages.
The United Kingdom Patent Office Combined Search and Examination Report for Great Britain Application GB 0301713.4 dated Jul. 16, 2003, 5 pages.

(56) References Cited

OTHER PUBLICATIONS

The United Kingdom Patent Office Combined Search and Examination Report for Great Britain Application GB 0301733.2 dated Jun. 27, 2003, 4 pages.
The United Kingdom Patent Office Combined Search and Examination Report for Great Britain Application GB 0301734.0 dated Jun. 27, 2003, 4 pages.
The United Kingdom Patent Office Combined Search and Examination Report for Great Britain Application GB 0301735.7 dated Jul. 4, 2003, 4 pages.
The United Kingdom Patent Office Combined Search and Examination Report for Great Britain Application GB 0301738.1 dated Jun. 9, 2003, 4 pages.
The United Kingdom Patent Office Combined Search and Examination Report for Great Britain Application GB 0301739.9 dated Jun. 17, 2003, 6 pages.
The United Kingdom Patent Office Combined Search and Examination Report for Great Britain Application GB 0301741.5 dated Jun. 16, 2003, 4 pages.
The United Kingdom Patent Office Combined Search and Examination Report for Great Britain Application GB 0301745.6 dated Jun. 17, 2003, 4 pages.
The United Kingdom Patent Office Combined Search and Examination Report for Great Britain Application GB 0301747.2 dated May 30, 2003, 5 pages.
European Patent Office, Extended European Search Report dated Feb. 24, 2017, from corresponding European Patent Application No. 08755643.7, 6 pages.

* cited by examiner

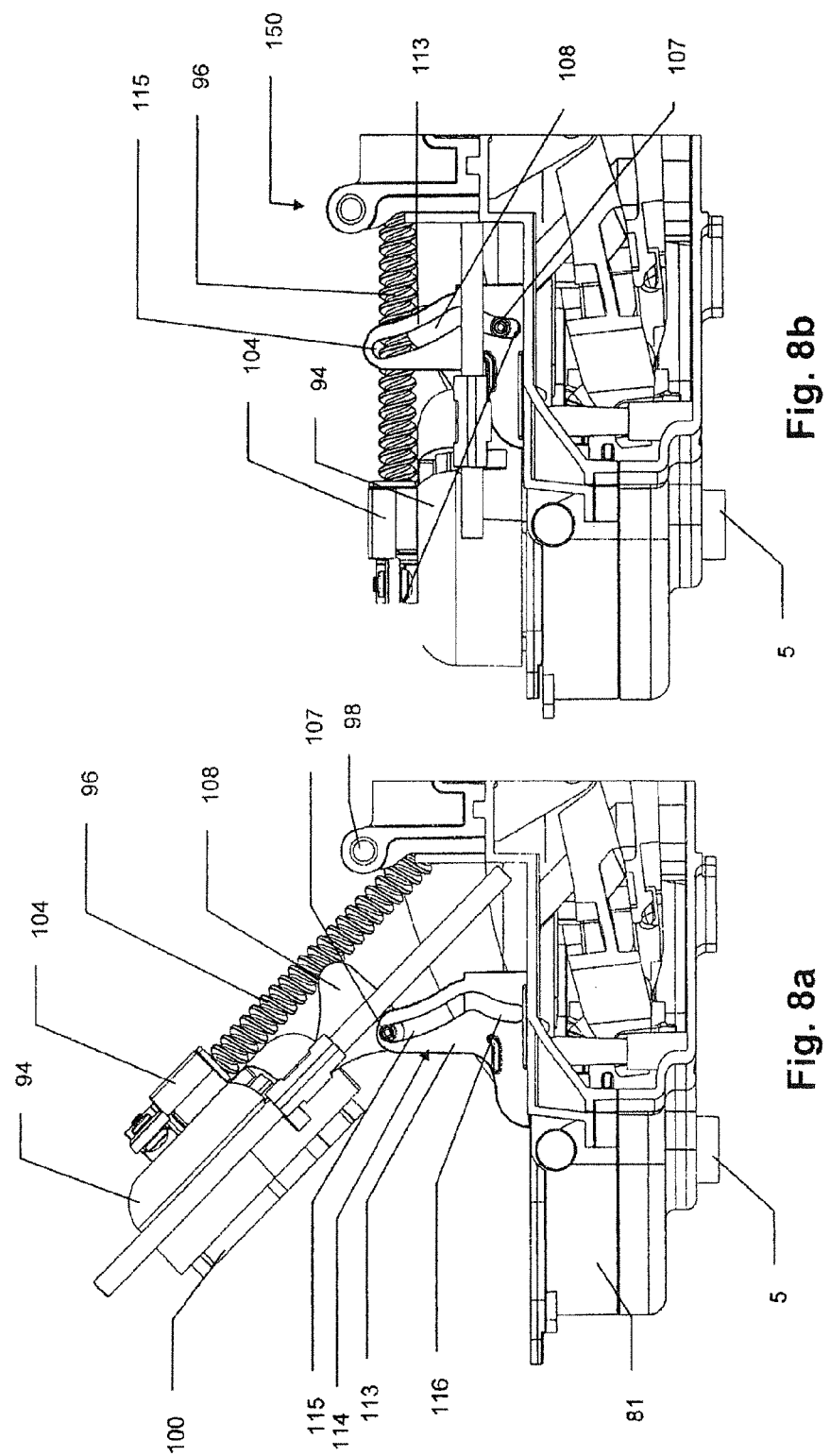

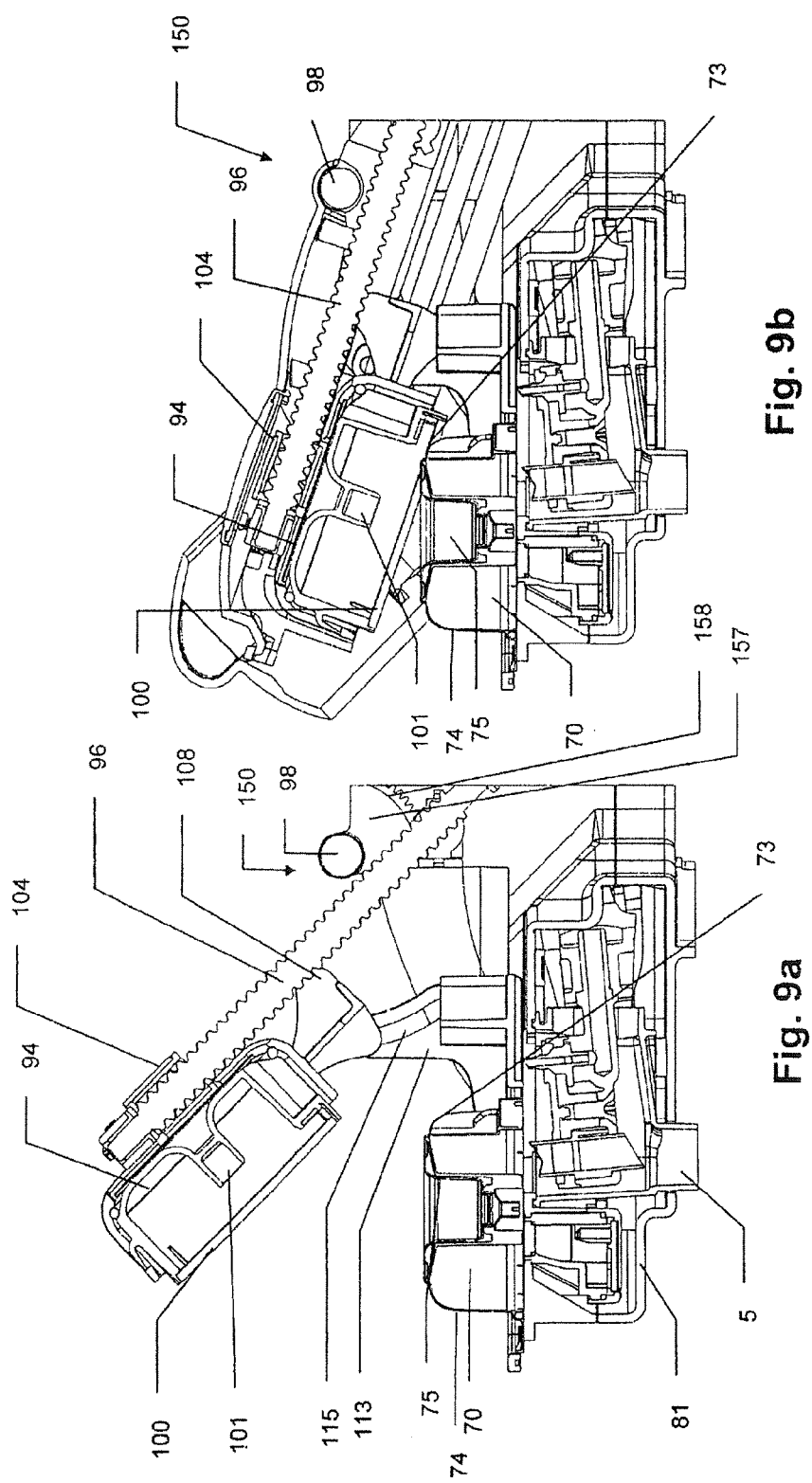

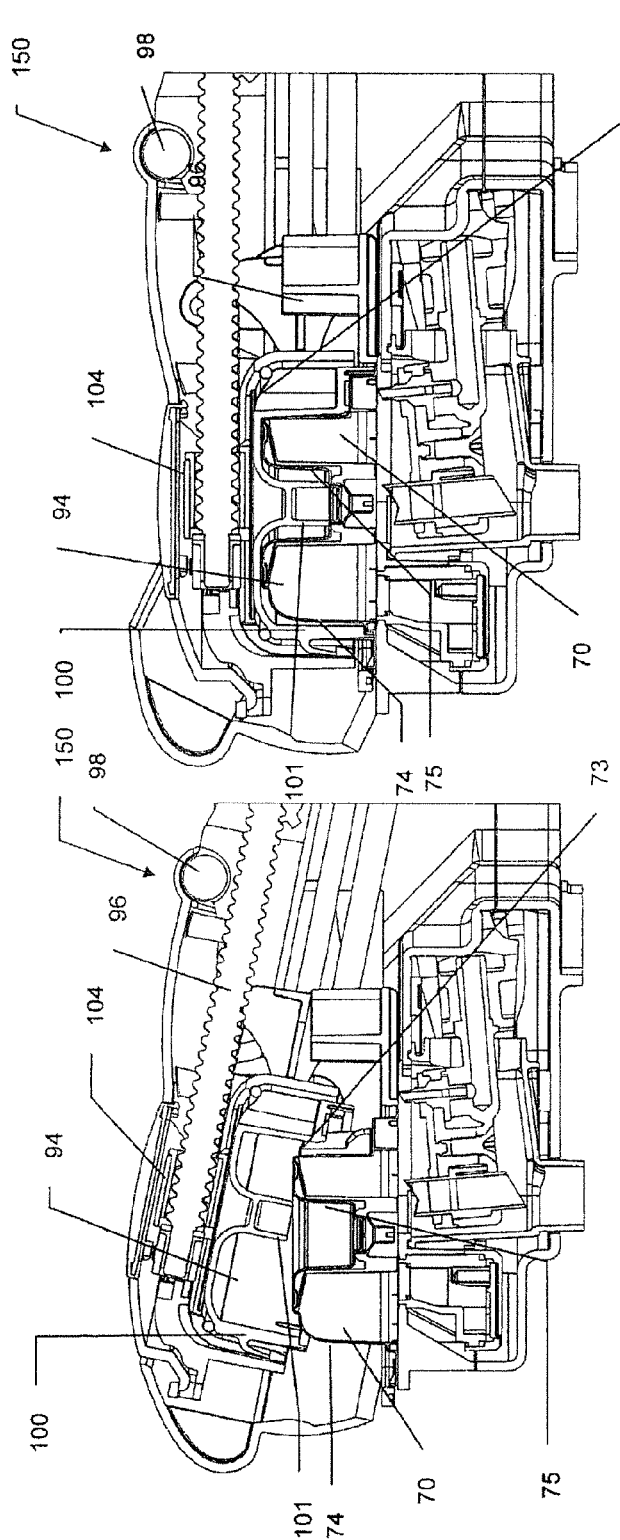

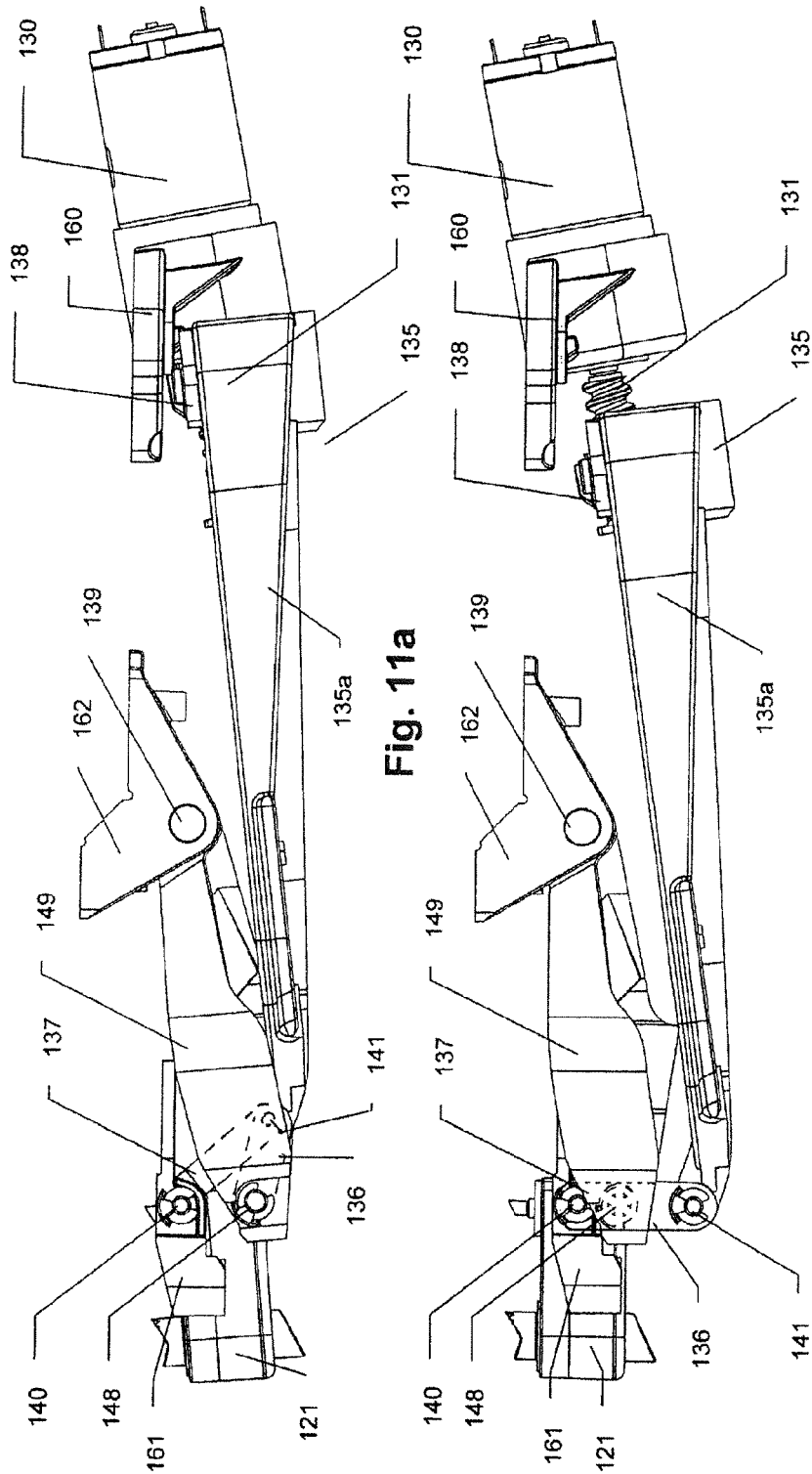

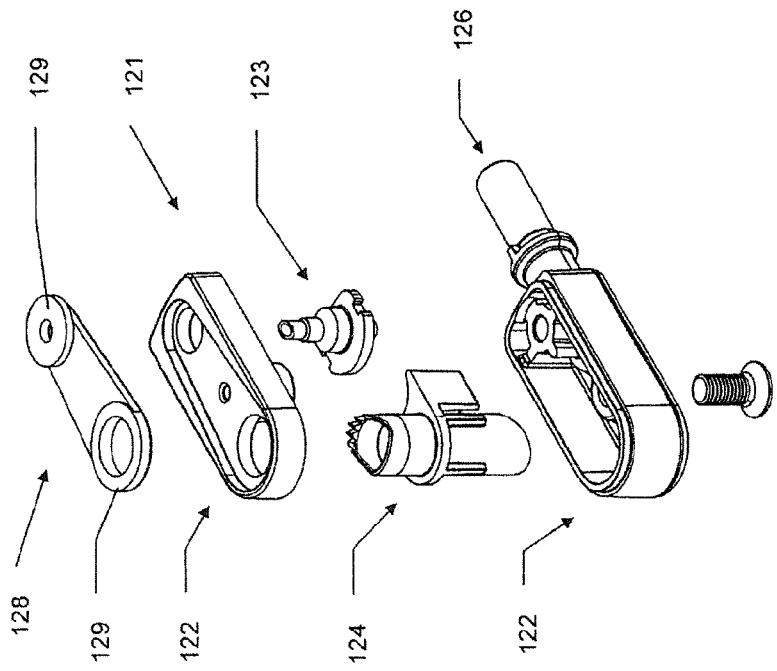
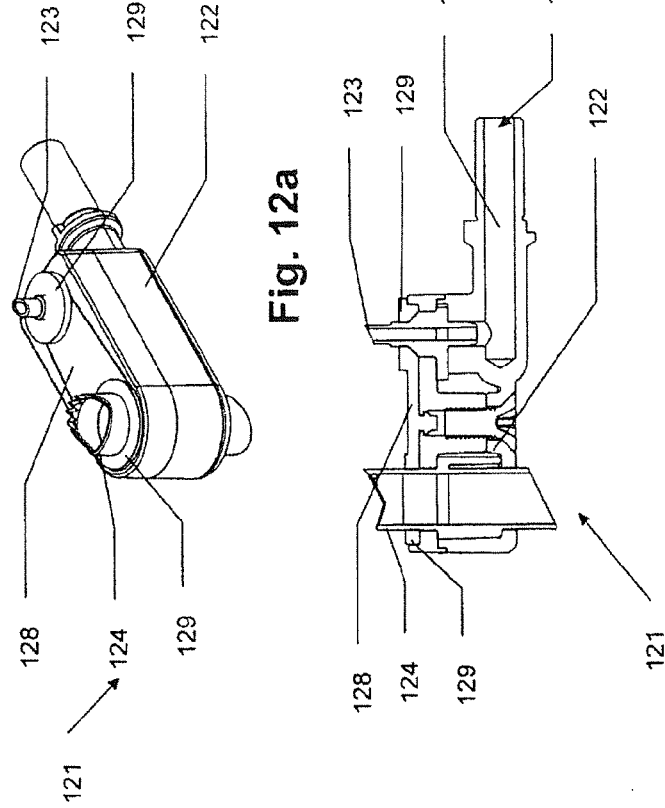

BEVERAGE PREPARATION MACHINES

CROSS-REFERENCE TO RELATED APPLICATIONS

This application is a continuation of U.S. patent application Ser. No. 12/600,627, having a 35 U.S.C. § 371(c) date of Apr. 13, 2010, which is a national phase application filed under 35 U.S.C. § 371 of International Application PCT/US2008/063832, filed on May 16, 2008, designating the United States, which claims benefit to U.S. Application No. 60/940,118, filed on May 25, 2007, and Great Britain application GB 0709589.6, filed on May 18, 2007, all of which are hereby incorporated by reference herein.

This application claims benefit to U.S. Application No. 60/940,118, filed on May 25, 2007, and Great Britain application GB 0709589.6 filed on May 18, 2007, both of which are hereby incorporated by reference herein.

FIELD

The present invention relates to improvements in beverage preparation machines and in particular to a delivery head for a beverage preparation machine of the type which use pre-packaged containers of beverage ingredients.

BACKGROUND

Beverage preparation machines such as coffee or tea brewing machines are well known. It is known to provide beverage preparation machines which dispense individual servings of beverage directly into a receptacle such as a cup. Such machines may derive the beverage from a bulk supply of beverage ingredients or from packages of beverage ingredients such as pods, pads or cartridges. An example of one type of such packages is shown in EP1440903. In the following specification such packages will be referenced by the general term cartridges. However, the invention is not limited to use with one particular type of pod, pad or cartridge. The beverages are formed from brewing, mixing, dissolving or suspending the beverage ingredients in water. For example, for coffee beverages, heated water is passed through the cartridges to form the extracted solution. The use of cartridges in such machines has become increasingly popular due to their convenience and the quality of the beverage produced.

In general, during use of such cartridges an inlet and an outlet are formed in the cartridge to allow for water entry and beverage discharge. Typically, the inlet and outlet are formed by piercing elements wherein either the cartridge or the piercing elements are moved in order to pierce the inlet and outlet. Beverage machines are know which use a carriage or platform which carries the cartridge and moves the cartridge relative to fixed piercing elements. It is also known to provide a vertically movable piercing element for piercing the inlet in a stationary cartridge. However, the piercing mechanisms of such machines tend to be bulky leading to the overall size of the machine being large.

SUMMARY

It is an object of the present invention to provide a delivery head and beverage preparation machine incorporating an improved piercing mechanism.

Accordingly, the present invention provides a delivery head for a beverage preparation machine comprising a movable first part and a fixed second part, the first part being movable relative to the second part between an open position and a closed position, in the open position the first part being positioned to enable loading of a cartridge into the delivery head, in the closed position the first part and second part being positioned to hold said cartridge in a dispensing position, the delivery head further comprising an inlet piercer and an outlet piercer, the inlet piercer and the outlet piercer being orientated substantially in the same direction and being pivotable relative to the fixed second part between a retracted position and a piercing position.

The use of pivoting inlet and outlet piercers allows for a more compact delivery head. In addition, piercing the inlet and the outlet in the same direction allows for a more compact unit since the cartridge only requires piercing in a single side or face.

Preferably the inlet piercer and the outlet piercer are orientated substantially vertically upwards in the piercing position.

Preferably the inlet piercer and the outlet piercer are orientated for piercing a lowermost face of said cartridge.

Preferably the retracted position of the inlet piercer and the outlet piercer is lower than the piercing position.

Preferably the retracted position of the inlet piercer and the outlet piercer is angled at between 5 and 10 degrees from the piercing position.

More preferably the retracted position of the inlet piercer and the outlet piercer is angled at greater than 7.5 degrees from the piercing position.

The fixed second part may comprise a horizontal support for said cartridge and the inlet piercer and the outlet piercer may extend vertically above the horizontal support in the piercing position.

Preferably the inlet piercer and the outlet piercer do not extend vertically above the horizontal support in the retracted position. Advantageously, this helps prevent user contact with the piercers when the first part is in an open position. In addition, retracting the piercers below the level of the support allows for easier removal of the cartridge after delivery.

Preferably the first part is pivotable between the open position and the closed position.

Preferably the delivery head further comprises a motor for pivoting the inlet piercer and the outlet piercer between the retracted and piercing positions. This allows for automation of the operation of the piercers by a controller of the machine.

Preferably the delivery head comprises a rear and a front wherein the motor is located to a rear of the delivery head and the inlet piercer and the outlet piercer are located to the front of the delivery head. In this way, the motor is located remote from the parts of the delivery head which are exposed to liquids during use. In particular the discharging beverage from the cartridge does not pass in the vicinity of the motor. This helps to keep the motor clean and operating correctly.

Preferably the motor is positioned at substantially the same height as the inlet piercer and the outlet piercer when in the raised position. Advantageously, the location of the motor at substantially the same height as the piercers rather than directly above or below the piercers allows for a more compact delivery head to be produced. In particular, the overall height of the delivery head can thus be minimised.

Preferably the motor is connected to the inlet piercer and the outlet piercer by a piercer mechanism.

Preferably the piercer mechanism is arranged to convert rotary motion of the motor into pivoting motion of the inlet piercer and the outlet piercer.

Preferably the delivery head further comprises an ejection passage into which said cartridge may be delivered wherein the ejection passage is located intermediate the inlet and outlet piercers and the motor. By positioning the motor on the opposite side of the ejection passage from the piercers, it is unnecessary for the cartridges during ejection to pass over or near the motor. Again, this helps to maintain the cleanliness of the motor.

Preferably the piercer mechanism spans the ejection passage.

In particular, the piercer mechanism may define an aperture and the ejection passage passes through said aperture.

The ejection passage may comprise an ejection chute, the ejection chute comprising a chute housing, wherein the chute housing passes through said aperture.

The piercer mechanism may comprise a primary link, the primary link comprising a first end and a second end, wherein the first end of the primary link is coupled to the motor such that rotation of the motor causes longitudinal movement of the primary link.

The primary link may be elongate in a longitudinal axis and movable substantially along its longitudinal axis in response to rotation of the motor.

The piercer mechanism may further comprise a secondary link, the secondary link comprising a first end and a second end, wherein the first end of the secondary link is coupled to the second end of the primary link wherein movement of the primary link causes the secondary link to rotate relative to the fixed second part.

Preferably the secondary link comprises a pair of secondary link members.

The piercer mechanism may further comprise a tertiary link, the tertiary link comprising a first end and a second end, wherein the first end of the tertiary link is coupled to the first end of the secondary link wherein movement of the secondary link causes the tertiary link to rotate relative to the fixed second part.

Preferably the tertiary link comprises a pair of tertiary link members.

The first end of the tertiary link may also be coupled to the second end of the primary link.

The second end of the tertiary link may be coupled to the fixed second part.

The delivery head may further comprise a quaternary link, the quaternary link being rotatably coupled to the fixed second part, wherein the second end of the secondary link is rotatably coupled to the quaternary link.

Advantageously the secondary link and the tertiary link form a toggle clamp mechanism. Advantageously because of this the secondary and tertiary links snap into, and have a propensity to remain in, a position associated with the piercing mechanism being in a raised position until a positive retraction force is applied by the motor.

Preferably in the piercing position, the secondary link and the tertiary link are orientated substantially vertically. In this way, the secondary and tertiary links are best orientated to absorb and withstand vertical loads applied downwardly during use to the piercing mechanism when the first part is in the closed position and the piercing mechanism is raised.

The delivery head may further comprise a body comprising the inlet piercer and the outlet piercer, wherein the body is rotatably coupled to the fixed second part.

Preferably the piercing mechanism comprises an aperture through which an ejection passage passes.

Advantageously the use of a sliding and rotatable linkage for the piercing mechanism ensures consistent and reliable operation of the mechanism. In particular, considering that portions of the linkage may come into contact with liquids during use, rotating link members which transfer rotary motion of the motor into pivoting motion of the piercers is preferable to use of a cam and follower arrangement because the cam surfaces of such arrangements can become soiled by dried-on deposits from the dispensed beverages.

In addition, the present linkage has the advantage that retraction or lowering of the piercers takes place under positive force—in other words the piercers are pulled down by the linkage—rather than relying on gravity or spring bias in order to return to their retracted position. This means the piercers are less likely to become stuck in the raised position.

The delivery head may further comprise a piercing unit wherein the piercing unit comprises the inlet piercer and the outlet piercer.

Preferably the piercing unit comprises a piercing body comprising a fluid inlet and a transfer conduit, the transfer conduit communicating between the fluid inlet and the inlet piercer.

Preferably the piercer body further comprises a unitary seal member which surrounds both the inlet piercer and the outlet piercer.

Preferably the piercing body, the inlet piercer and the outlet piercer are separate components which are assemblable to form the piercer unit.

The present invention also provides a beverage preparation machine comprising a delivery head as described above.

Further the present invention provides a beverage preparation system comprising the beverage preparation machine as described above and one or more cartridges, wherein the one or more cartridges contain one or more beverage ingredients.

The present invention also provides a method of use of a beverage preparation machine having a delivery head of the type having a movable first part, a fixed second part, an inlet piercer and an outlet piercer, the inlet piercer and the outlet piercer being orientated substantially in the same direction and being pivotable relative to the fixed second part between a retracted position and a piercing position, comprising the steps of:

moving the first part into an open position;
loading a cartridge into the delivery head;
moving the first part into a closed position so as to clamp the cartridge in a dispensing position;
rotating the inlet piercer and the outlet piercer into the piercing position to pierce said cartridge;
dispensing a beverage from the cartridge;
rotating the inlet piercer and the outlet piercer from the piercing position into the retracted position;
moving the cartridge to an ejection position;
ejecting the cartridge.

Preferably in the piercing position both the inlet piercer and the outlet piercer are orientated substantially vertically upwards.

Preferably the inlet piercer and the outlet piercer rotate by between 5 and 10 degrees between the retracted position and the piercing position.

More preferably the inlet piercer and the outlet piercer rotate by greater than 7.5 degrees between the retracted position and the piercing position.

Preferably the movement of the inlet piercer and the outlet piercer is motorised.

Preferably the first part pivots between the open position and the closed position.

Preferably the cartridge translates between the dispensing position and an ejection position.

BRIEF DESCRIPTION OF THE DRAWINGS

An embodiment of the present invention will now be described, by way of example only, with reference to the accompanying drawings in which:

FIGS. 8a and 8b are elevational views of the delivery head of FIG. 3 with some parts shown in section and some parts omitted for clarity illustrating movement of a cartridge guide of the delivery head;

FIGS. 9a to 9d are cross-sectional views of the delivery head of FIGS. 8a and 8b with some parts sectioned and with a second cartridge inserted, illustrating movement of the cartridge guide on closure of the delivery head;

FIGS. 11a and 11b illustrate operation of the piercing mechanism of FIG. 10; and FIGS. 12a to 12c illustrate a piercer unit of the delivery head of FIG. 3.

DETAILED DESCRIPTION

Figure 2:
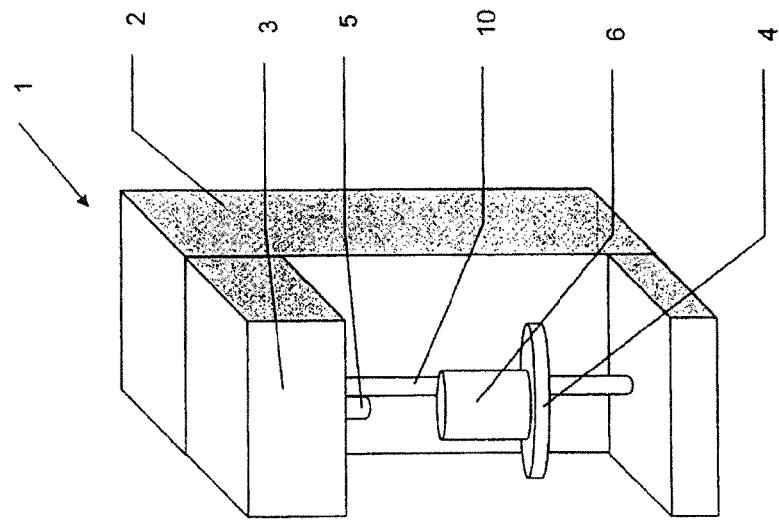
FIG. 2 is a perspective view of a second version of beverage preparation machine according to the present invention which includes a single delivery head.
Figure 1:
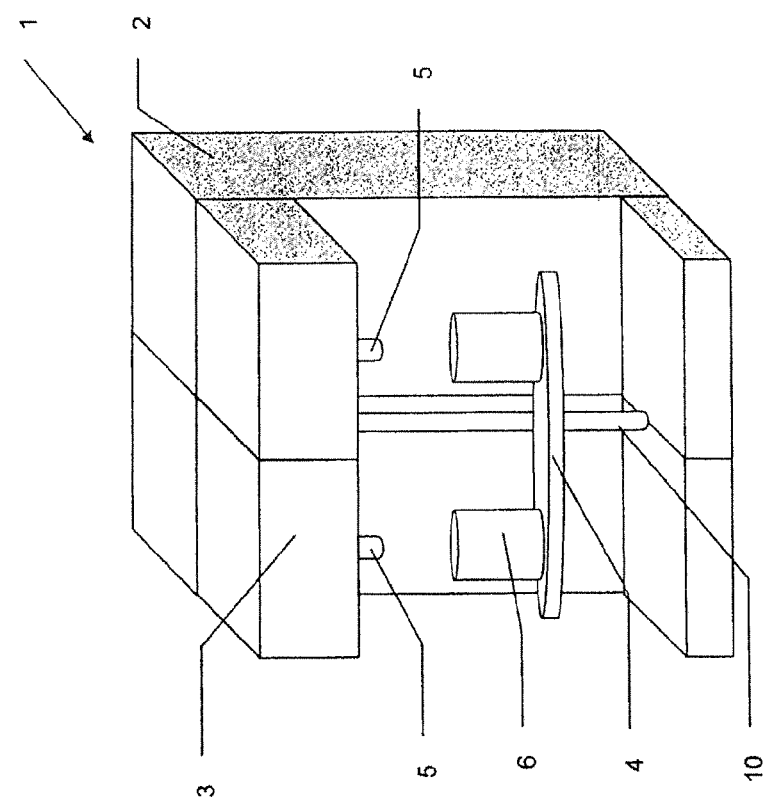
FIG. 1 is perspective view of a first version of beverage preparation machine according to the present invention which includes first and second delivery heads.

The beverage preparation machines 1 of FIGS. 1 and 2 each comprise a housing 2 containing the internal mechanisms of the machine such as a water reservoir, a pump, heating means and control means.

The machine 1 of FIG. 2 comprises a single brewer. The machine 1 of FIG. 1 comprises a first brewer and a second brewer coupled together.

Each brewer of the machines 1 comprises a delivery head 3 provided towards an upper part of the housing 2 in which, in use, is received a cartridge containing one or more beverage ingredients. The delivery head or heads 3 are connected with a chassis of the machine 1 on assembly. The delivery heads 3 are preferably identical. Beverage is dispensed from the brewer through an outlet spout 5 by pumping water from the reservoir of the brewer through the cartridge to form the beverage which is then directed through the outlet spout 5 into a cup 6. As can be seen in FIG. 1, two outlet spouts 5 are provided for a machine with two brewers.

Figure 3:
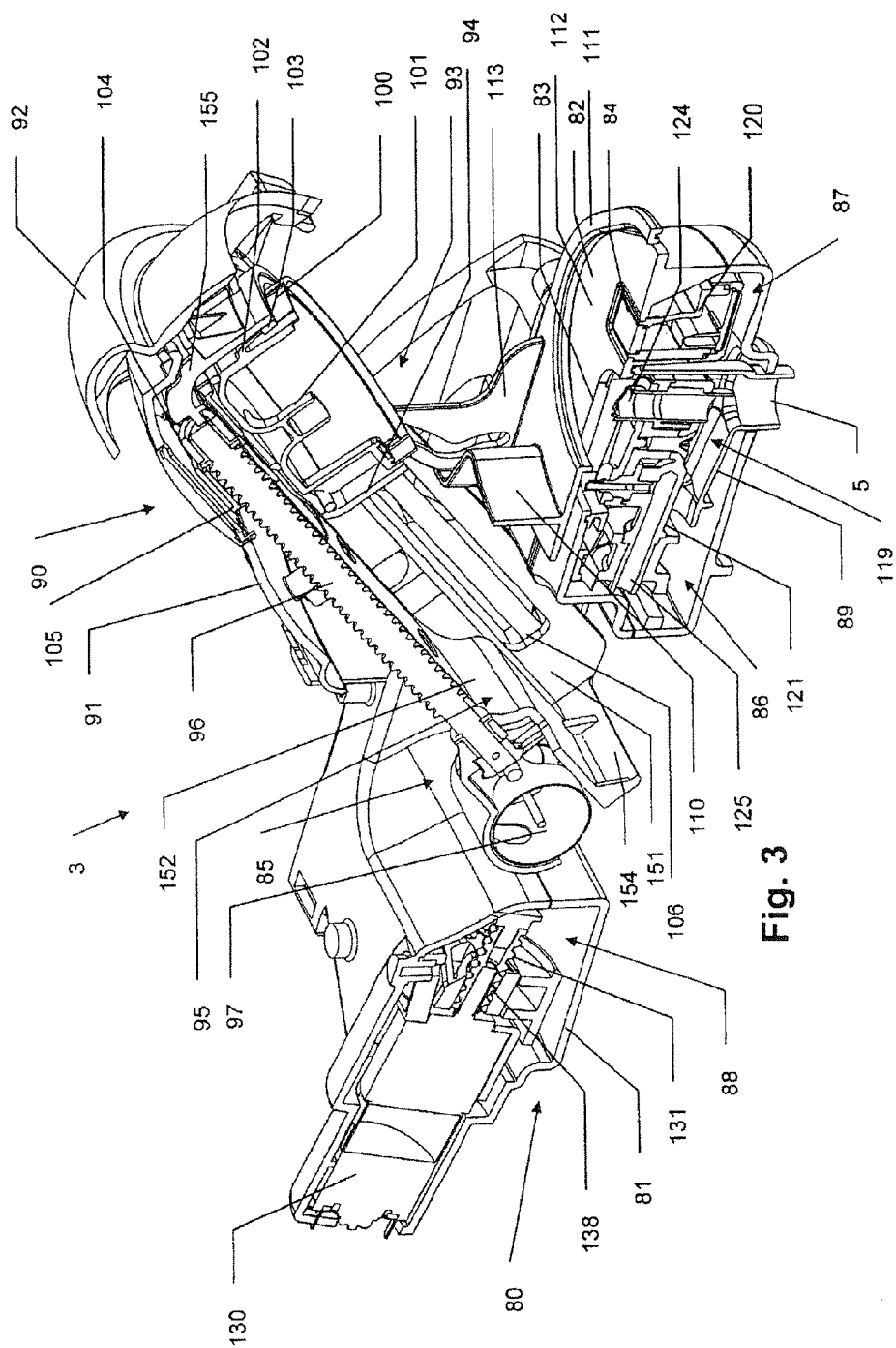
FIG. 3 is a cross-sectioned perspective view of a delivery head according to the present invention in an open position.

As shown in FIG. 3, the delivery head 3 comprises a lower part 80, an upper mechanism 90 and a cartridge guide 110.

Some parts of the outer cowling of the delivery head have been omitted for clarity. In practice the outer cowling will comprise a number of mouldings shaped to contain and protect the internal components of the delivery head.

The lower part 80 comprises a housing 81 formed from upper and lower mouldings. The housing 81 defines a motor cavity 88 towards a rear of the delivery head 3, a piercer unit cavity 86 towards a front of the delivery head 3 and a barcode reader cavity 87 at a foremost portion of the delivery head 3. A forward part of the upper surface of the housing 81 is provided with a flattened support surface 82 in which is located a piercer unit aperture 83 and a barcode window 84. Rearward of the support surface 82 the upper moulding is shaped to define an ejection chute 85 that is open to below the delivery head 3.

The upper mechanism 90 comprises a carriage frame 95, a handle 92, a clamping mechanism 93, a lead screw 96, and a motor 97.

The carriage frame 95 forms the core of the upper mechanism and provides a structural framework for the other components of the upper mechanism. The carriage frame 95 comprises an elongate frame extending from a front end 155 to a rear end 154 as shown in FIG. 3. The frame comprises two side members 151 and an upper member 152 joining the two side members 151. The upper member 152 is provided with two upstanding webs 156 as most clearly shown in FIG. 9b. Each side member 151 comprises an elongate side slot 106 and the upper member 152 comprises an elongate upper slot 153 as most clearly shown in FIG. 5. The carriage frame 95 is preferably formed from a single moulding and is symmetric about a midline of the delivery head 3.

The carriage frame 95 is pivoted to the lower part 80 by a pair of hinges 98 formed on the upstanding webs 156 at pivot points 150 as most clearly seen in FIGS. 9b to 9d. The hinges 98 are offset from the upper surface of the lower part 80 and positioned above the level of the support surface 82. As most clearly shown in FIG. 9a by omission of certain parts of the housing 91, the hinges 98 may comprise a cog 157 having teeth 158 which engage with a damping member during pivoting of the carriage frame 95 to thereby provide control over the pivoting speed of the carriage frame 95. For example, the damping member may act to ensure that if the handle 92 of the delivery head 3 is released when the carriage frame 95 is in the raised position then the carriage frame 95 pivots downwardly in a controlled manner rather than free-falling into contact with the lower part 80. The damping member may comprise a cog suitable for engaging the cog 157 and a damper, such as a rotatable vane, movable within a viscous damping fluid such as oil.

The handle 92 is connected to the carriage frame 95 and extends around a front of the delivery head 3. The handle 92 is pivotably connected to the carriage frame 95 by a mechanism such that with the carriage frame 95 in a lowered position the handle 92 can be depressed to engage hooks provided on the handle 92 with bosses provided on the lower part 80 in order to securely hold the carriage frame in the lowered position. An example of such a mechanism is described in EP1440644. However, such a mechanism is not relevant to the present invention. The clamping mechanism 93 comprises a cup-shaped clamp member 100 and a cup-shaped socket 94. The clamp member 100 is provided with a central spigot 101. A plurality of flexible protrusions 102 are provided on an exterior of the clamp member 101 which engage with an inwardly-directed flange 103 of the socket 94 so as to retain the clamp member 100 fixedly within the socket 94 on assembly. The socket 94 is provided on an upper surface with a cylindrical member 104 in which is seated a threaded nut 105. The threaded nut 105 is engaged on the lead screw 96. The socket 94 of the clamping mechanism 93 is also provided with a pair of bosses or similar which are engaged in, and slidable along the side slots 106 of the carriage frame 95 so as to maintain correct orientation of the socket 94 on operation of the lead screw 96. Consequently, rotation of the lead screw 96 can be used to move the socket 94, and hence the clamp member 100 reciprocally along the longitudinal axis of the upper mechanism 90 from the front end 155 to the rear end 154 of the carriage frame 95 as will be described below when the operation of the delivery head 3 is discussed. As best shown in FIGS. 8a and 8b the socket 94 further comprises a pair of tail pieces 108 which extend rearwardly from either side of the cup-shaped body of the socket 94. The tail pieces 108 are each provided with a pin 107 at or near a distal end thereof, the use of which will be described below.

Figure 5:
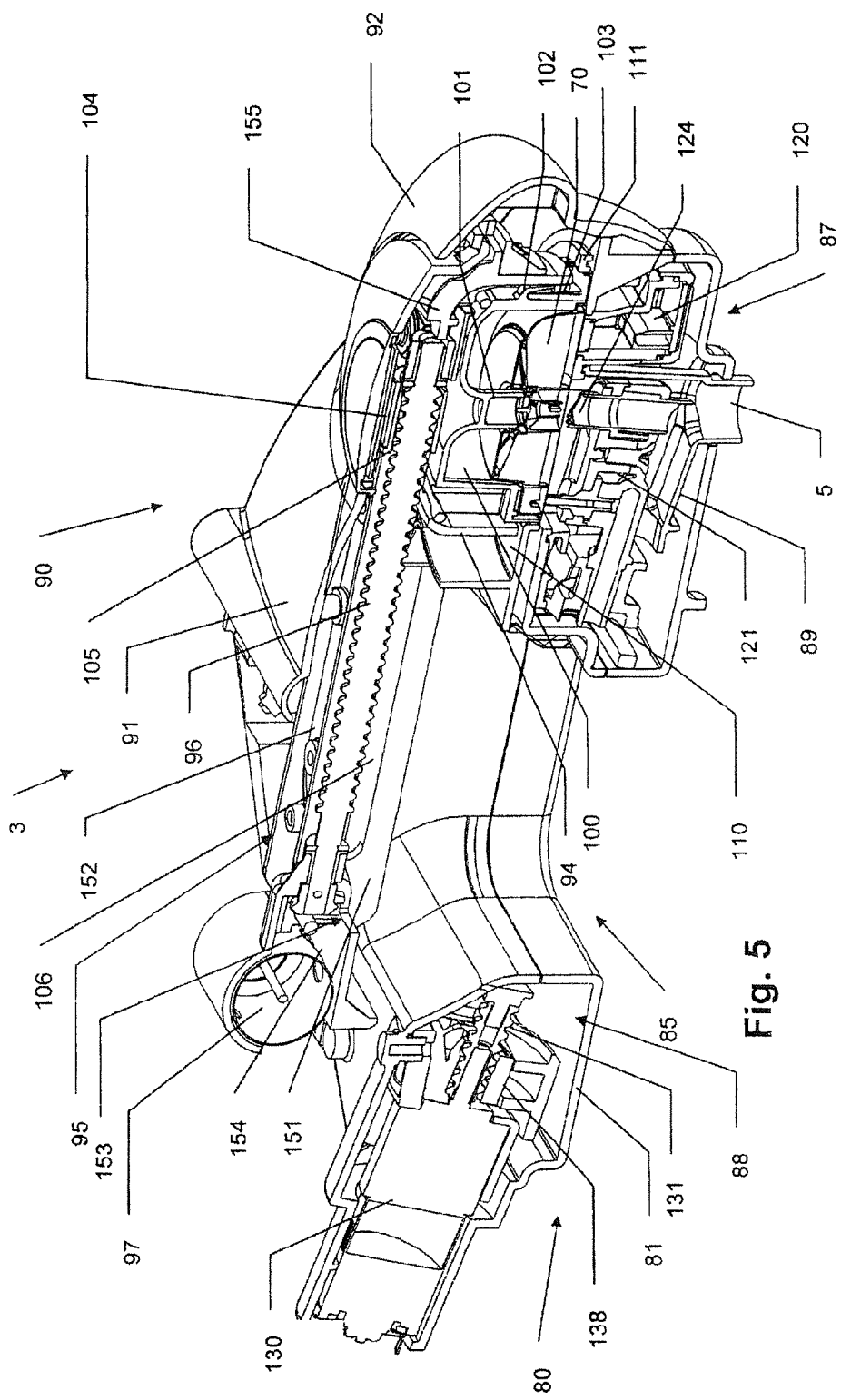
FIG. 5 is a cross-sectioned perspective view of the delivery head of FIG. 3 in a closed position with the cartridge in a dispensing position.

The lead screw 96 is mounted to the carriage frame 95. The lead screw 96 is located towards a top of the carriage frame 95 in the opening provided by the upper slot 153 as shown in FIG. 5. Thus, the lead screw 96 extends above the socket 94 and extends along the longitudinal axis of the upper mechanism 90 from the rear end 154 to the front end 155 of the carriage frame 95. The motor 97 is operatively connected to a rear end of the lead screw 96 and is able to rotate the lead screw 96 both clockwise and counter-clockwise. As shown, the motor 97 is mounted to the carriage frame 95 and transverse the longitudinal axis of the upper mechanism 90 to save space and is connected to the lead screw 96 by means of a suitable gear arrangement such as bevel gears.

The cartridge guide 110 is located inbetween the lower part 80 and the upper mechanism 90. The cartridge guide 110 rests on and is slidable relative to the lower part 80 whilst being operatively interconnected with the upper mechanism 90 as described below.

Figure 4:
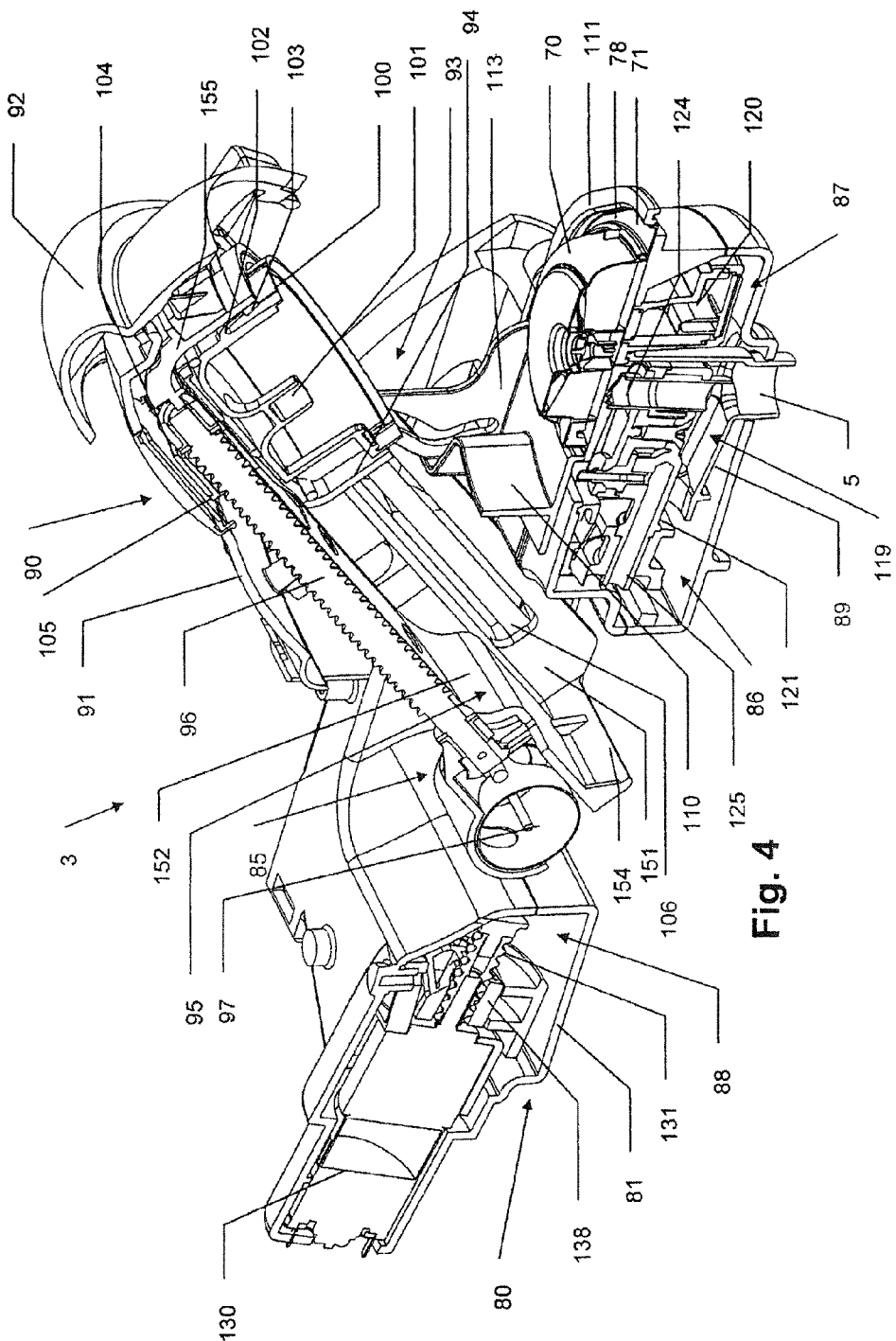
FIG. 4 is a cross-sectioned perspective view of the delivery head of FIG. 3 in the open position and with a first cartridge inserted.

The cartridge guide 110 comprises an annular member 111 and two vertically extending webs 113. The annular member 111 and webs 113 are formed as a single moulding from, for example, a plastics material. The annular member 111 comprises a ring defining an aperture 112 shaped to receive a cartridge 70. The lower face of the cartridge guide 110 rests on the support surface 82. Whilst the aperture 112 closely conforms to the shape of the cartridge 70 in order to enable precise orientation and placement of the cartridge, it is slightly larger than the cartridge 70 such that a cartridge 70 placed within the aperture 112 rests on the support surface 82 of the lower part 80 rather than on the cartridge guide 110 itself. The aperture 112 is shaped also to accommodate a handle portion 71 of the cartridge 70 as shown in FIG. 4. The handle 71 is thereby orientated to a front of the delivery head 3 and positioned symmetrically on the midline of the delivery head 3.

The webs 113 are located on each side of the cartridge guide 110 and, as best shown in FIGS. 8a and 8b, are each provided with a slot 114 of arcuate form in which, on assembly, the pins 107 of the socket 94 are slidingly received. Thus, the cartridge guide 110 and the clamping mechanism are interconnected. Each slot 114 comprises a first portion 115 in the shape of an arc having a centre of rotation coincident with the pivot point 150 of the clamping mechanism 93. Each slot 114 also comprises a second portion 116 in the shape of an arc whose instantaneous centre of curvature is not co-incident with the pivot point 150. The function of the slot 114 will be described below.

The delivery head 3 further comprises a barcode reader 120 and a piercing mechanism 119.

The barcode reader 120 is located in the barcode reader cavity 87 and is orientated to be able to transmit and receive signals through the barcode window 84.

The piercing mechanism 119 comprises a piercer unit 121, a motor 130, a lead screw 131 and a linkage mechanism 133. The piercing mechanism 119 is operative to raise and lower the piercer unit 121. The piercer unit 121 is located in the piercer unit cavity 86 of the lower part 80.

As shown in FIGS. 12a to 12c the piercer unit 121 comprises a body 122 having mounted therein an inlet piercer 123 and an outlet piercer 124. The body 122 is provided with a conduit 125 linking the inlet piercer 123 with a fluid inlet 126 of the body 122. The fluid inlet 126 is coupled by pipework to a supply of water on assembly of the delivery head with the remainder of the machine 1. A seal member 128 is located on an upper face of the body 122 surrounding the inlet piercer 123 and the outlet piercer 124. The seal member 128 is provided with raised annular portions 129 surrounding the piercing element of the inlet piercer 123 and the piercing element of the outlet piercer 124.

The piercer unit cavity 86 is also provided with a spout chute 89 as shown in FIG. 3 into which the piercer unit 121 extends. The spout chute 89 acts as a funnel to channel beverage discharged through the outlet piercer 124 to the outlet spout 5 located at a bottom of the spout chute 89.

The motor 130 is located at a rear of the delivery head 3 remote from the piercer unit 121. The motor 130 is orientated generally in line with a longitudinal axis of the lower part 80 but is angled downwardly slightly below the horizontal. The motor 130 is coupled to the lead screw 131 by means of a threaded, generally U-shaped, rear coupling member 138 as most clearly seen in FIG. 10. A distal end of the lead screw 131 is provided with an end stop. The motor 130 is able to rotate the lead screw 131 both clockwise and counter-clockwise in order to move the rear coupling member 138 reciprocally forwards and backwards relative to the lower part 80.

Figure 10:
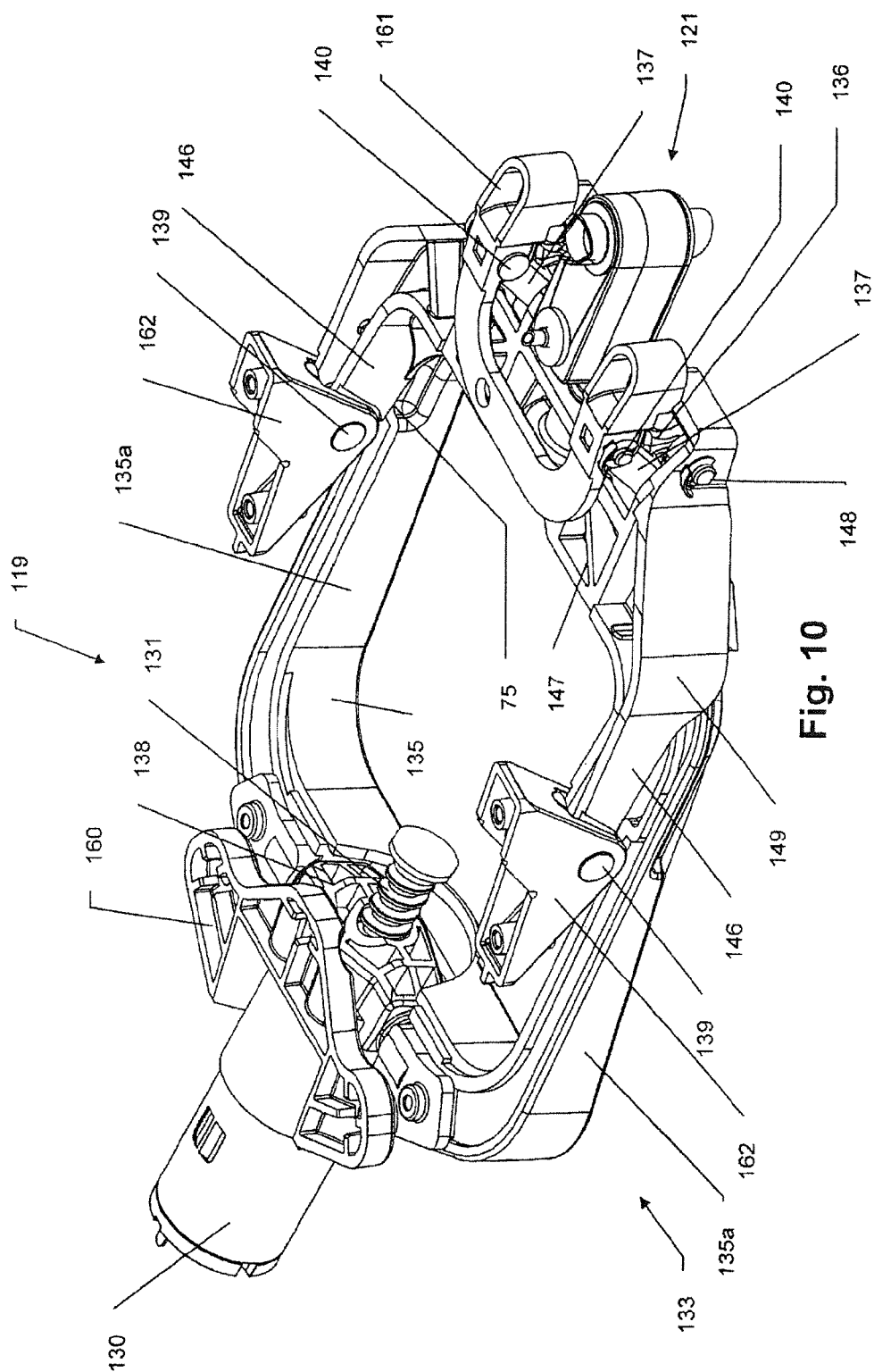
FIG. 10 is a perspective view of a piercing mechanism of the delivery head of FIG. 3.

As shown in FIG. 10, the linkage mechanism 133 comprises a U-shaped primary link 135 having a pair of forward-extending arms 135a, a pair of secondary links 136, a pair of tertiary links 137, the rear coupling member 138 and a forward coupling member 149. The linkage mechanism is mounted to the lower part 80 by means of a rear mounting plate 160, a front mounting plate 161 and two side mounting plates 162 which are all securely mounted to an underside of the upper moulding of the lower part 80.

A pair of first pivot points 139 are provided by the side mounting plates 162. A pair of second pivot points 140 are provided by the front mounting plate 161.

As most clearly shown in FIGS. 10, 11a and 11b, the U-shaped primary link 135 is rotatably coupled at a rear end to the rear coupling member 138.

The forward coupling member 149 comprises a generally U-shaped member having two arms 146 and an interconnecting bridge 147. The distal ends of the arms 146 are rotatably coupled to the first pivot points 139.

The secondary links 136 are rotatably connected to the primary link arms 135a at third pivot points 141 such that a forward end of each primary link arm 135a is connected to a rear end of the respective secondary link 136. The opposite end of each secondary link 136 is rotatably coupled to the forward coupling member 149 at fourth pivot points 148.

The tertiary links 137 are connected between the third pivot points 141 (where the primary link arms 135a and secondary links 136 are coupled) and the second pivot points 140 on the front mounting plate 161.

The piercing unit 121 is rigidly mounted to the interconnecting bridge 147 of forward coupling member 149 as shown in FIG. 10 Alternatively the piercer unit 121 could be formed as one piece with the front coupling member 149.

As most clearly shown in FIG. 10, the linkage mechanism 133 transfers motive force from the motor 130 at the rear of the delivery head 3 to a front of the delivery head 3. In addition, by using pairs of primary link arms 135a, secondary links 136 and tertiary links 137 as well as U-shaped members 135, 149 the linkage mechanism extends around the ejection chute 85 without impeding the chute as shown in FIG. 5.

Operation of the piercing mechanism 119 will be described below.

The beverage preparation machine also comprises a controller for controlling operation of the machine including operation of components of each delivery head 3 such as the motors 95, 130, and the barcode reader 120.

The delivery head 3 may also be provided with interlock or sensing devices linked to the controller to provide data to the controller on the position of the socket 94 on its lead screw 96, the position of the piercing mechanism 119 and the position of the upper mechanism 90, for example whether the upper mechanism 90 is in the closed position Typically an interlock is provided to confirm closure of the handle 92 when the upper mechanism 90 is in the lowered position. Operation of the delivery head 3 is prevented when this interlock indicates that the handle 92 is opened.

As an alternative to providing an interlock on the lead screw 96 to indicate the position of the socket 94 current sensing control may be used. In current sensing the current drawn by the motor 97 is monitored and the controller interprets an increase in the drawn current above a pre-set threshold to be indicative of the socket 94 having reached one of its end stops at either the front end 155 or rear end 154 of the carriage frame 95.

In use, the delivery head 3 is first opened to allow insertion of a cartridge 70 of the type having a bowl-shaped upper portion 76 sealed by a flexible lower membrane 77 around a peripheral flange 78 by moving the upper mechanism 90 into the raised position as shown in FIG. 3. Opening of the upper mechanism is achieved by first opening the handle 92 to disengage the hooks from the bosses of the lower part 80 and then lifting the handle 92. As shown in FIG. 3 and in FIG. 9a, in the raised position of the upper mechanism 90, the cartridge guide 110 is positioned in a forward-most position to ease loading of the cartridge 70 and the clamping member 100 is raised as part of the upper mechanism 90. The cartridge guide 110 is thus positioned because of the interaction of the pins 107 of the tail pieces 108 in the slots 114 of the cartridge guide 110. In particular in the raised position each pin 107 is moved to a top of the first portion 115 of the slot 114 as shown in FIG. 9a.

The cartridge 70 is then inserted into the aperture 112 of the cartridge guide 110 such that the cartridge 70 rests on the support surface 82 as shown in FIG. 4. In FIG. 4 the delivery head 3 is shown with a cartridge 70 having a relatively shallow profile. The handle portion 71 of the cartridge 70 is aligned towards a front of the delivery head 3 and lies on the midline of the delivery head 3.

The upper mechanism 90 is then closed into the position shown in FIG. 5 by pressing down on the handle 92. Closure of the upper mechanism 90 causes the cartridge guide 110 and the cartridge 70 to slide rearwardly over the support surface 82 into a dispensing position wherein the cartridge 70 is correctly aligned with the piercer aperture 83 and the barcode window 84. The rearward movement of the cartridge guide 110 is caused by the interaction of the pins 107 and slots 114. As shown in FIG. 8a, 8b and FIGS. 9a to 9d downward rotation of the upper mechanism 90 causes the clamping mechanism 93 also to rotate downwardly moving the pins 107 first along the first portion 115 of the slots 114 and then along the second portion 116. Movement of the pins 107 along the first portion 115 of the slots to the position shown in FIG. 9c does not cause any movement of the cartridge guide 110 since the centre of curvature of the first portion 115 is coincident with the point of rotation of the clamping mechanism 93. However, further downward rotation of the clamping mechanism 93 does cause rearward sliding of the cartridge guide 110 due to the pins 107 bearing against a rearmost face of the slots 114 to thereby force the cartridge guide 110 to move to accommodate the pin's movement into the position shown in FIG. 9d. In the closed position of the clamping mechanism 93 the cartridge guide 110 has moved in a rearward direction by between 7.8 and 10 mm.

In the closed position the spigot 101 of the clamping member 100 is engaged in a relatively shallow central well 75 formed in the upper portion 76 of the cartridge 70. The clamping member 100 is also provided with a formation 79 aligned with an inlet region of the cartridge 100. The lower rim of the clamping member 100 is aligned with and is designed to make contact with the peripheral flange 78 of the cartridge 70 in the closed position. Thus, in the closed or clamped, position the clamping member 100 applies a clamping force on the cartridge 70. This force is mainly applied to the central region of the cartridge 70 by the spigot 101 and to the inlet region of the cartridge 70 by the formation 79. However, if required the lower rim of the clamping member 100 may apply a relatively small force to the peripheral flange 78. At this point the piercer unit 121 is still lowered. Therefore the force applied to the cartridge 70 urges the cartridge into contact with the support surface 82. Thus, the lower membrane 77 carries some of the applied load in the area immediately surrounding the piercer aperture 83. In addition, the remainder of the load applied to the cartridge 70 is carried through the peripheral flange 78 where it contacts the support surface 82.

Closure of the upper mechanism 90 also triggers operation of the barcode reader 120 to read the barcode on the cartridge 70 by transmitting through the barcode window 84. The received detected signal is then fed to the controller which thereby determines the correct dispense parameters for the inserted cartridge, such as water temperature, volume, steeping time, etc.

Opening of the upper mechanism 90 after a dispense cycle and ejection have taken place results in a reversal of the movement of the cartridge guide 110 described above.

A particular advantage of this movement of the cartridge guide 110 is to allow accommodation of cartridges having a relatively deep profile, such as the type of cartridge 70 shown in FIGS. 9a to 9d. As shown in FIGS. 9a to 9d maintaining the cartridge guide 110 in the loading position of FIG. 9a until the clamping mechanism 93 has rotated partially down to the point shown in FIG. 9c allows the lower rim of the clamping member 100 to clear the upper rear point 73 of the cartridge 70. The subsequent rearward movement of the cartridge 70 allows for a clamping member 100 that closely conforms to the diameter of the cartridge to be used whilst avoiding fouling of the clamping member's rim on a front face 74 of the cartridge or of the spigot 101 on the sides of the relatively deep central well 75 of the cartridge 70. In this way the size of the clamping member 100 is minimised without requiring a substantially vertical movement of the clamping mechanism 93 to be used to allow insertion of cartridges of varying depth.

Figure 6:
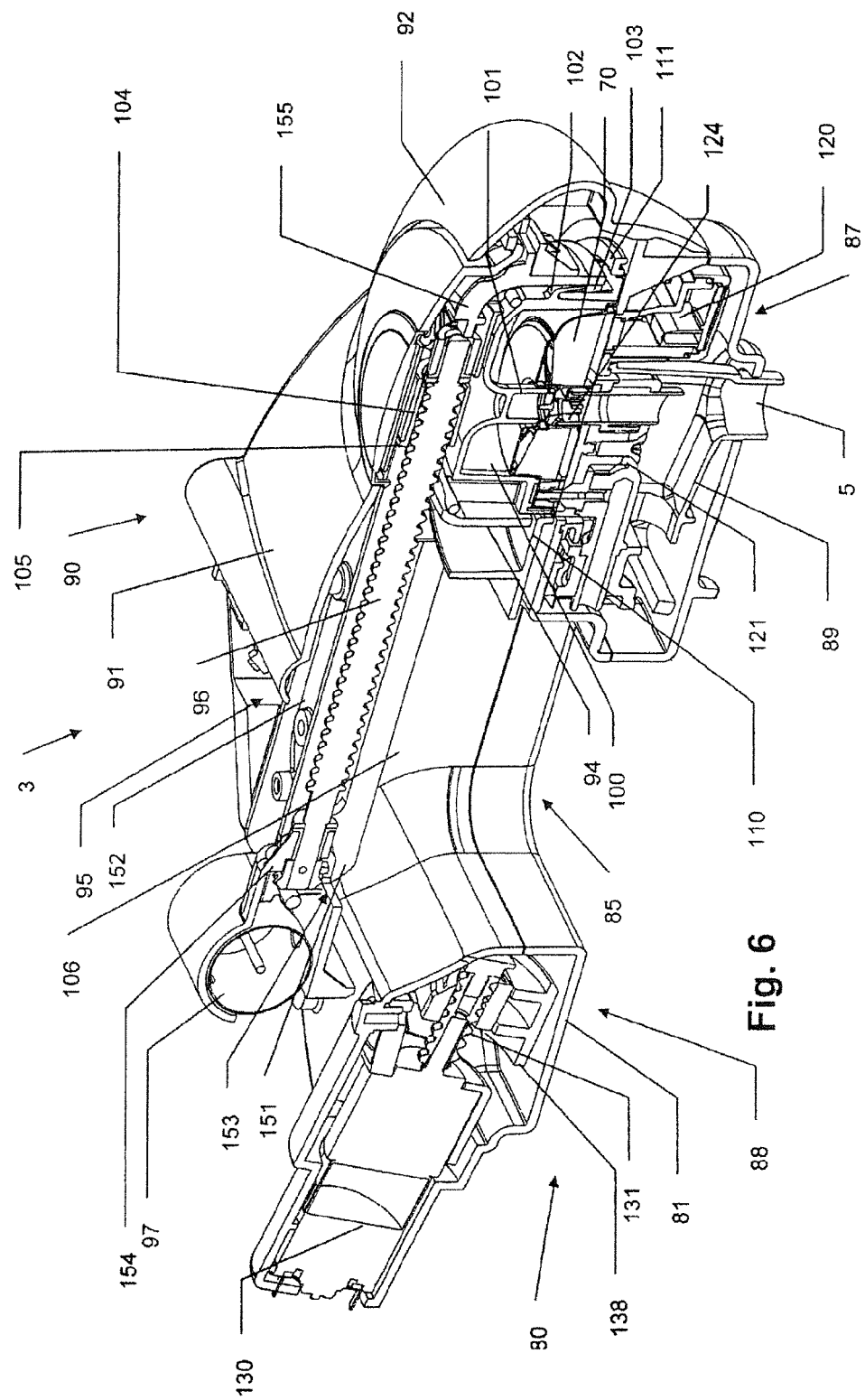
FIG. 6 is a cross-sectioned perspective view of the delivery head of FIG. 3 in the closed position with a piercing unit of the delivery head in a raised position.

As shown in FIG. 5, at this point the piercer unit 121 is in the lowered position such that the inlet piercer 123 and outlet piercer 124 are fully below the level of the support surface 82. On receipt of a start command from the user (by for example, pressing a start/stop button), the controller of the machine 1 operates the motor 130 to raise the piercing mechanism 119 into the raised position shown in FIG. 6 such that the inlet piercer 123 and outlet piercer 124 are raised proud of the level of the support surface 82. In the raised position the piercer unit 121 is raised to the point where the seal member 128 is orientated substantially horizontally with the general level of the seal member 128 being level with the support surface 82. However, in this position the raised annular portions 129 of the seal member 128 lie slightly above the level of the support surface 82. In this way the raised annular portions 129 are able to distort slightly and thereby tension the flexible lower membrane 77 of the cartridge 70. The peripheral flange 78 of the cartridge 70 remains in contact with the support surface 82 due to the constraining contact of the lower rim of the clamping member 100.

In addition, the upward movement of the piercer unit 121 urges the cartridge 70 more tightly against the spigot 101 and the formation 79 of the clamping member 100 to increase the clamping force which holds the cartridge 70 in position between the clamping member 100 and the piercer unit 121. Thus, the combination of the action of the clamping member 100 and the piercer unit 121 creates a minimum clamping force of 30 N at the inlet of the cartridge and a force of between 75 and 130 N at the outlet.

The movement of the piercing mechanism 119 from lowered to raised position is most clearly seen in FIGS. 11a and 11b and involves a rotation of the piercer unit 121 about its pivot point of between 5 and 10 degrees and preferably greater than 7.5 degrees. On operation of the motor 130, the rear coupling member 138 is moved forwards by approximately 20 mm by rotation of the lead screw 131. As a result of the coupling of the rear coupling member 138 with the primary link 135 the primary link 135 is moved substantially in a direction in line with the longitudinal axis of the primary link although this may be accompanied by a slight rotational movement of the primary link 135 relative to the rear coupling member 138. At the same time the primary link arms 135a push on the lower ends of the secondary links 136. Due to the constraint of the tertiary links 137, which couple the primary link arms 135a and the secondary links 136 to the second pivot points 140, the pushing movement of the primary link arms 135a causes the secondary links 136 to rotate in a clockwise sense as viewed in FIG. 11b. This rotation results in upward rotation of the front coupling member 149 due to the coupling of the secondary links 136 to the front coupling member 149 and the coupling of the arms 148 of the front coupling member 149 to the first pivot points 139 of the side mounting plates 162. Upward rotation of the front coupling member 149 consequently results in upward rotation of the piercer unit 121 due to the rigid connection of the piercer unit 121 to the front coupling member 149. In the raised position, the tertiary links 137 are substantially vertical and also aligned with the secondary links 136 which are also vertically aligned. In this position the secondary and tertiary links are best able to resist the downward loads applied by the clamping member 100 to the cartridge 70. The movement of the secondary and tertiary links also acts in the manner of a toggle clamp wherein the secondary and tertiary links snap into, and have a propensity to remain in, the position of FIG. 11b until a positive retraction force is applied by the motor 130.

Raising of the piercing mechanism 119 causes piercing of the cartridge 70 by the inlet piercer 123 and the outlet piercer 124 to form respectively an inlet and an outlet in the underside of the cartridge 70.

Once the controller detects that the piercer unit 121 is in the raised position dispensation of a beverage from the cartridge 70 begins. As with operation of the lead screw 96 current sensing of the motor 130 may be used by the controller to determine the position of the piercer unit 121. Heated water is channelled from the fluid inlet 126 through the conduit 125 and inlet piercer 123 and into the cartridge. The resultant beverage is discharged through the outlet piercer 124, spout chute 89 and out of outlet 5 into a waiting receptacle 6.

Once dispensation has stopped the piercer unit 121 is lowered by reversing the operation described above by operating the motor 130 in a reverse direction. This clears the inlet piercer 123 and the outlet piercer 124 out of the ejection path of the cartridge 70 and also removes a portion of the loading applied to the cartridge 70.

Figure 7:
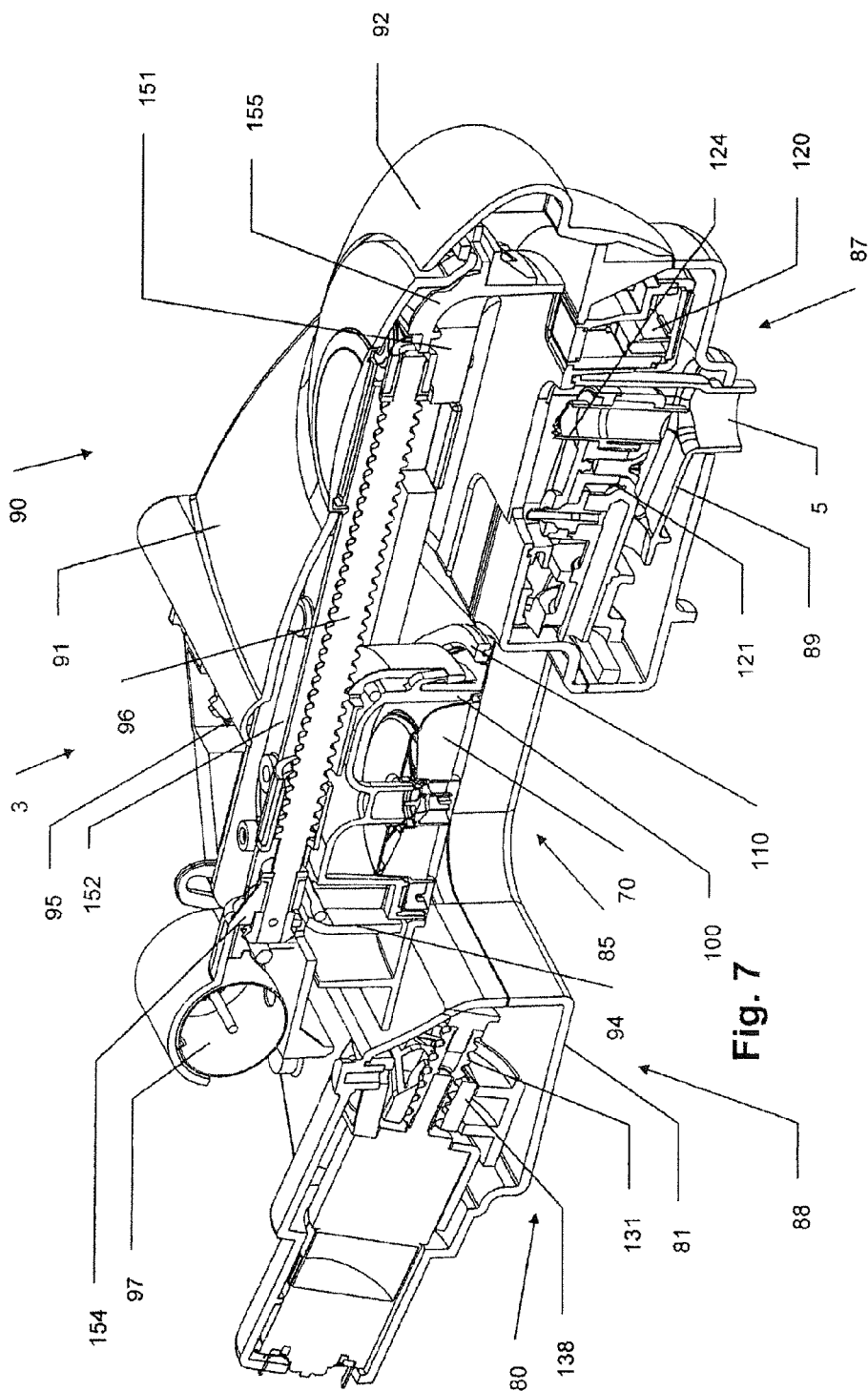
FIG. 7 is a cross-sectioned perspective view of the delivery head of FIG. 3 in an ejection position.

The controller then operates motor 97 to eject the cartridge 70 by movement of the cartridge 70 to an ejection position. Operation of the motor 97 rotates the lead screw 96 causing the clamping socket 94 and clamping member 100 to slide rearwards into the position shown in FIG. 7. The clamping member 100 moves the cartridge 70 along with it thereby dragging the cartridge 70 over the ejection chute 85. During this movement the cartridge 70 is still under some loading from the socket 94 of the upper mechanism 90. Once the cartridge 70 is substantially or wholly aligned with the chute 85 it falls under gravity down the chute 85 into a waste bin in a lower part of the machine 1. It is to be noted that during this movement the outer part of the housing 91 of the upper mechanism 90 remains stationary such that the motion of the clamping mechanism 93 remains internal to the delivery head 3. A particular advantage is that the delivery head 3 does not need to be opened in order to eject the cartridge 70. In addition, the clamping mechanism 93 affects not only clamping of the cartridge 70 during dispensation of beverage but also ejection of the cartridge 70.

The motor 97 is then reversed to move the clamping mechanism 93 back into the forward position ready for the next dispensing cycle.

Optionally a steam purge may be used to clean the piercer unit cavity 86, support surface 82, and clamping member 100. Steam is directed through the inlet piercer 123. The steam purge may be carried out with the piercer body 121 in the raised or lowered position. In addition, it may be carried out automatically after each dispensation cycle and or carried out from time to time under either manual user control or automatic control of the controller. A steam purge may also be used during the dispensation cycle when the cartridge 70 is in the dispensation position to dry out the cartridge 70 and to help drive out any remaining liquid in the cartridge 70.

The invention claimed is:

1. A delivery head for a beverage preparation machine comprising a movable first part and a fixed second part,
the first part being movable relative to the second part between an open position and a closed position,
in the open position the first part being positioned to enable loading of a cartridge into the delivery head, in the closed position the first part and second part being positioned about said cartridge in a dispensing position thereof, the delivery head further comprising a body and an inlet piercer and an outlet piercer supported by the body, the inlet piercer and the outlet piercer being orientated in the same direction to pierce a common side of the cartridge and the body having the inlet and outlet piercers supported thereby is pivotally connected to the fixed second part so as to pivot the inlet and outlet piercers between a retracted position and a piercing position relative to the fixed second part.

2. The delivery head of claim 1 wherein the body includes an internal fluid conduit connected to the inlet piercer for supplying an aqueous medium through the inlet piercer and into the cartridge.

3. The delivery head of claim 1 wherein the inlet piercer and outlet piercer are oriented vertically in the piercing position.

4. The delivery head of claim 1 wherein the inlet piercer and outlet piercer extend parallel to each other with the inlet and outlet piercers in the retracted and piercing positions.

5. The delivery head of claim 1 in combination with the cartridge, the cartridge having an outer member and a lid connected to the outer member that includes the common side of the cartridge.

6. The delivery head of claim 5 wherein the lid has a generally circular shape and the inlet piercer and outlet piercer are arranged to pierce the lid at a center of the lid and a position spaced from the center along a radius of the lid.

7. The delivery head of claim 1 wherein the outlet piercer includes a tubular member.

8. A beverage preparation machine comprising:
a fixed second part;
a first part movable relative to the fixed second part between an open position that permits loading of a cartridge and a closed position;
an inlet piercer and an outlet piercer configured to pierce a common side of the cartridge;
a body, the inlet piercer and outlet piercer being supported by the body, the body being pivotally connected to the fixed second part so as to pivot the inlet and outlet piercers between a retracted position and a piercing position relative to the fixed second part; and
an internal fluid conduit of the body connected to the inlet piercer for supplying an aqueous medium to the inlet piercer.

9. The beverage preparation machine of claim 8 wherein the inlet piercer and outlet piercer are oriented vertically in the piercing position.

10. The beverage preparation machine of claim 8 wherein the inlet piercer and outlet piercer extend parallel to each other with the inlet and outlet piercers in the retracted and piercing positions.

11. The beverage preparation machine of claim 8 further comprising a receiving member having an opening sized to receive a portion of the cartridge and connected to the fixed second part, the receiving member being movable relative to the fixed second part with the cartridge portion received in the opening and the first part in the closed position.

12. The beverage preparation machine of claim 8 wherein the internal fluid conduit of the body is formed in the body.

* * * * *

UNITED STATES PATENT AND TRADEMARK OFFICE
CERTIFICATE OF CORRECTION

PATENT NO. : 9,907,432 B2
APPLICATION NO. : 14/738824
DATED : March 6, 2018
INVENTOR(S) : Roger Geoffrey Tanner and Andrew Michael Halliday Page 1 of 1

It is certified that error appears in the above-identified patent and that said Letters Patent is hereby corrected as shown below:

In the Specification

In Column 1, Lines 15-18, delete "This application claims benefit to U.S. Application No. 60/940,118, filed on May 25, 2007, and Great Britain application GB 0709589.6 filed on May 18, 2007, both of which are hereby incorporated by reference herein.".

Signed and Sealed this
First Day of May, 2018

Andrei Iancu
*Director of the United States Patent and Trademark Office*